United States Patent
Masuda et al.

(10) Patent No.: US 8,836,763 B2
(45) Date of Patent: Sep. 16, 2014

(54) IMAGING APPARATUS AND CONTROL METHOD THEREFOR, AND 3D INFORMATION OBTAINING SYSTEM

(75) Inventors: Tomonori Masuda, Saitama (JP); Youichi Sawachi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 833 days.

(21) Appl. No.: 12/981,638

(22) Filed: Dec. 30, 2010

(65) Prior Publication Data
US 2011/0228043 A1    Sep. 22, 2011

(30) Foreign Application Priority Data

Mar. 18, 2010   (JP) ................................. 2010-062558

(51) Int. Cl.
*H04N 15/00*    (2006.01)
*H04N 13/02*    (2006.01)

(52) U.S. Cl.
CPC ........ *H04N 13/0221* (2013.01); *H04N 13/0296* (2013.01); *H04N 13/0285* (2013.01); *H04N 13/0203* (2013.01); *H04N 13/0239* (2013.01)
USPC ............................................. 348/46; 348/49

(58) Field of Classification Search
None
See application file for complete search history.

(56) References Cited

U.S. PATENT DOCUMENTS

| | | | |
|---|---|---|---|
| 6,809,771 B1 | 10/2004 | Hamaguchi et al. | |
| 7,466,336 B2* | 12/2008 | Regan et al. | 348/50 |
| 2003/0152263 A1* | 8/2003 | Kawano et al. | 382/154 |
| 2006/0098106 A1* | 5/2006 | Tanaka | 348/231.99 |
| 2006/0216010 A1* | 9/2006 | Yamanouchi et al. | 396/55 |
| 2009/0160931 A1* | 6/2009 | Pockett et al. | 348/42 |
| 2010/0085422 A1* | 4/2010 | Yamashita et al. | 348/36 |

FOREIGN PATENT DOCUMENTS

| | | |
|---|---|---|
| EP | 0 645 926 A1 | 3/1995 |
| JP | 5-231822 A | 9/1993 |
| JP | 7-95467 A | 4/1995 |
| JP | 11-88811 A | 3/1999 |
| JP | 2001-12910 A | 1/2001 |
| JP | 2006-121229 A | 5/2006 |

\* cited by examiner

*Primary Examiner* — Joseph Ustaris
*Assistant Examiner* — Kevin McInnish
(74) *Attorney, Agent, or Firm* — Birch, Stewart, Kolasch & Birch, LLP

(57) ABSTRACT

In a pantoscopic camera, right and left images, which overlap with each other, are captured from a subject. Overlap areas are detected from these images, and a composite image is produced from either of the overlap areas and non-overlap areas of the respective images. So long as a shutter button is not operated, the right and left images are successively captured to display the composite image as a moving through-image on an LCD. When the shutter button is pressed halfway, the LCD is switched from the composite image to an overlap area image that corresponds to the overlap area. On the basis of the detected overlap areas, 3D information on the subject may be obtained, or a stereoscopic image may be displayed.

15 Claims, 20 Drawing Sheets

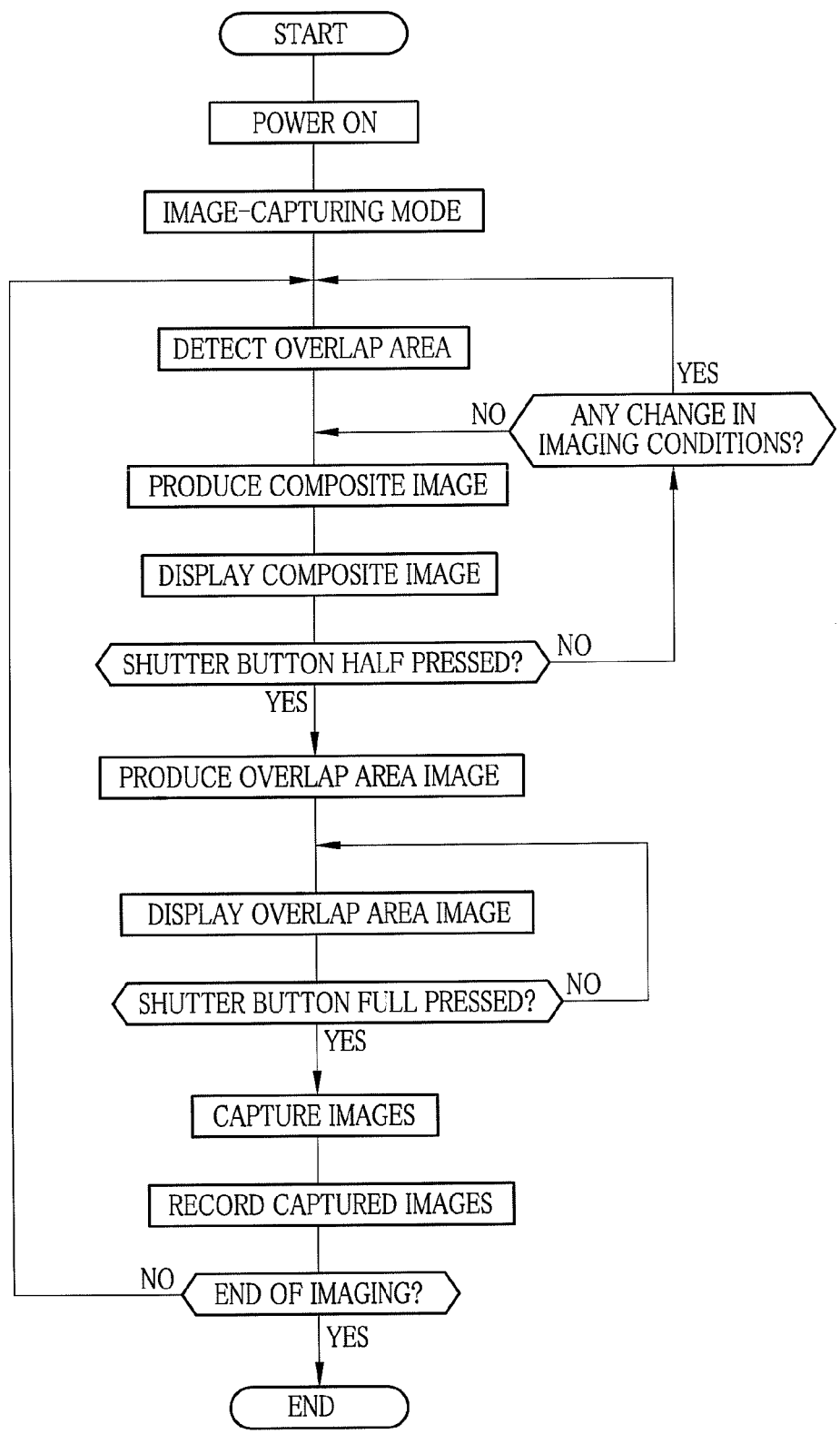

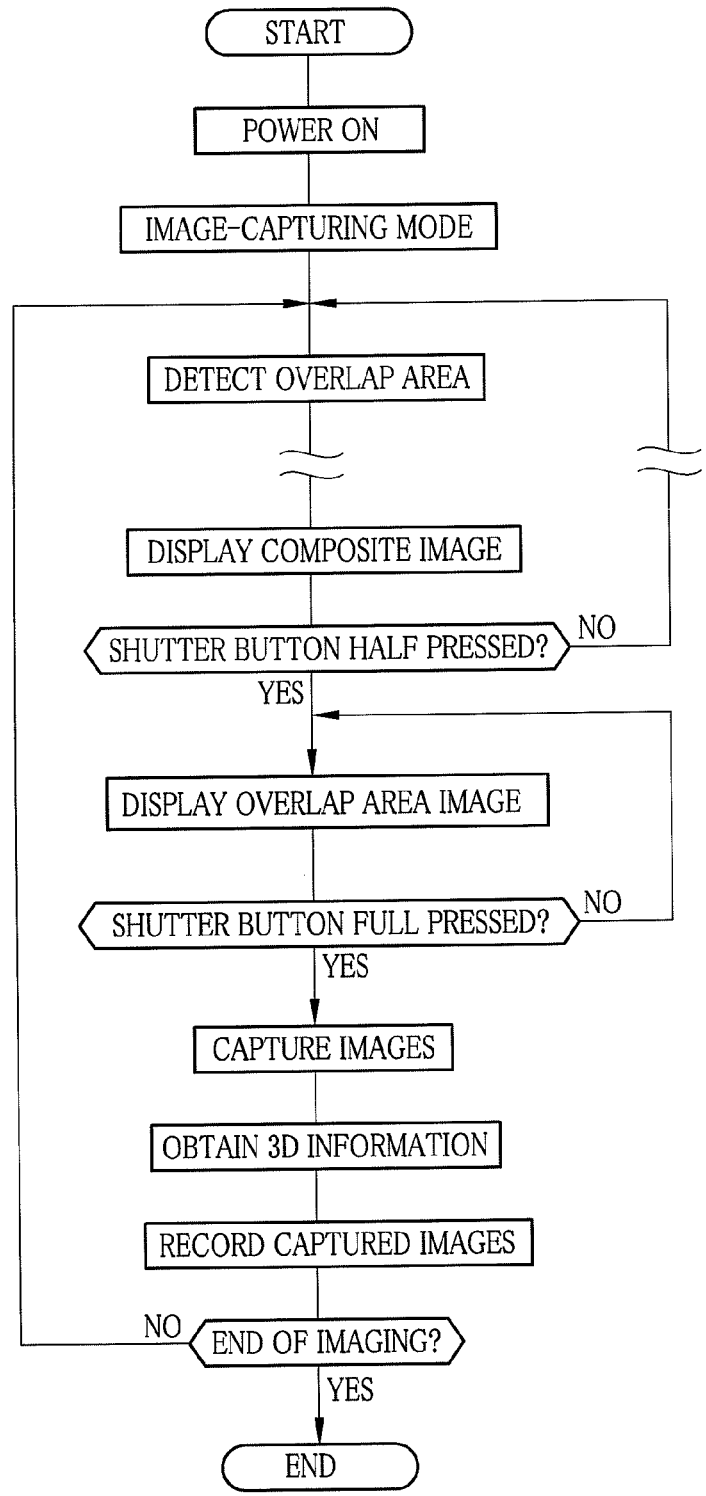

IMAGING APPARATUS AND CONTROL METHOD THEREFOR, AND 3D INFORMATION OBTAINING SYSTEM

BACKGROUND OF THE INVENTION

1. Field of the Invention

The present invention relates to an imaging apparatus that is used for obtaining three-dimensional (3D) information on a subject, and a method of controlling displaying images on the imaging apparatus. The present invention also relates to a 3D information obtaining system that includes the imaging apparatus.

2. Description of the Related Art

A pantoscopic camera captures more than one image of a subject at a time from different viewpoints, and these images may be used for obtaining 3D information about the subject, which represents the spatial position of the subject in a predetermined spatial or 3D coordinate system. The 3D information may be obtained using a known distance calculation method, such as disclosed in JPA 1993-231822, wherein correspondence of pixels between a pair of images captured at the same time is determined using one of various matching methods. On the basis of respective pairs of corresponding pixels and stereo-calibration data, such as a reference length of the pantoscopic camera, distances from the pantoscopic camera to multiple points on the subject that correspond to the respective corresponding pixels are calculated to be 3D coordinate values.

The above-mentioned distance calculation can provide 3D information of only those pixels which are within overlap areas of each pair of images. In order to obtain 3D information from a particular subject, the user should frame the scene so as to contain the particular subject within the overlap area before pressing the shutter button, or in a camera as disclosed in JPA 1999-88811, before an automatic image-capturing starts.

Generally, framing is done while watching the subject through a viewfinder or a through-image displayed on a monitor that functions as an electronic viewfinder. In one pantoscopic imaging apparatus disclosed in European Patent No. 0 645 926 B (corresponding to JPA 1995-95467), a composite image is produced by combining a pair of images on the basis of detected overlap areas of these images, and the composite image is displayed on a monitor as a through-image. In a stereo camera disclosed in JPA 2006-121229, overlap areas are detected from a pair of images of an identical scene or subject, and a framing window or border line of the overlap area is overlaid on a through-image corresponding to the pair of images.

U.S. Pat. No. 6,809,771 (corresponding to JPA 2001-12910) discloses a multi-scope data input apparatus that crops a subject image area containing an aimed subject from each of a pair of captured images, to display an image having the subject image areas overlaid on one another. On the basis of this prior art, it may be possible to crop an overlap area from each of a pair of images and display an image corresponding the overlap areas.

According to the methods disclosed in European Patent No. 0 645 926 B (corresponding to JPA 1995-95467) and JPA 2006-121229, the composite image displayed as a through-image contains not only the overlap area but also non-overlap areas of the respective image pair. Therefore, when deciding the framing position, the user cannot exactly check if the aimed subject is contained in the overlap area. According to the method disclosed in U.S. Pat. No. 6,809,771 (corresponding to JPA 2001-12910), on the contrary, the through-image merely contains the overlap area even before the user does not decide on the framing, and the user cannot check the wider range of the view field of the camera. This is inconvenient for the user to decide on the framing.

SUMMARY OF THE INVENTION

The present invention is provided to solve the above problem, and has an object to provide an imaging apparatus that can display through-images in the way to facilitate deciding on the framing, and a method of controlling displaying images on the imaging apparatus. The present invention also provides a 3D information obtaining system that includes the imaging apparatus.

An imaging apparatus in accordance with an aspect of the present invention comprises an imaging device, an overlap area detecting device, a composite image producing device, an overlap area image producing device, a display device, a decision-of-framing detecting device, and a display control device.

The imaging device captures a plurality of images of a subject from different points of view, the plurality of images overlapping with each other at respective overlap areas.

The overlap area detecting device detects an overlap area from each of the plurality of images captured by the imaging device.

The composite image producing device produces a wide angle composite image from the plurality of images on the basis of a result of detection by the overlap area detecting device, wherein the composite image is composed of one overlap area and respective non-overlap areas other than the overlap areas of the plurality of images.

The overlap area image producing device produces an overlap area image from at least one of the plurality of images, wherein the overlap area image corresponds to at least one of the overlap areas.

The decision-of-framing detecting device that detects whether the imaging apparatus is fixed at a framing position for image-recording or not.

The display device displays the composite image as a moving image while the framing position of the imaging apparatus is not fixed. When the decision-of-framing detecting device detects that the imaging apparatus is fixed at a framing position, the display control device switches the display device from the composite image to the overlap area image.

In one embodiment, if the composite image originally has a different aspect ratio from that of screen size of the display device, the composite image producing device trims parts of the non-overlap areas of the composite image to adjust the composite image in aspect ratio to the screen size.

In another embodiment, if the composite image originally has a different aspect ratio from that of screen size of the display device, the composite image producing device compresses the non-overlap areas of the composite image such that the display device can display the whole content of the composite image.

The composite image producing device may compress the whole composite image to adjust aspect ratio of the composite image to screen size of the display device such that the display device can display the whole content of the composite image.

Preferably, the imaging apparatus further includes a standstill detecting device that determines whether the imaging apparatus is at a standstill or not. The decision-of-framing detecting device determines that the imaging apparatus is fixed at a framing position when the standstill detecting device detects a standstill of the imaging apparatus.

It is possible to detect a movement of the imaging apparatus from a shift amount between successive two image frames obtained by the imaging device, and determine that the imaging apparatus is at a standstill when the movement of the imaging apparatus is below a threshold level. The threshold level may preferably be changed according to the zooming position of the imaging optical system.

In one embodiment, the overlap area image producing device produces from the plurality of images a plurality of the overlap area images corresponding to the respective overlap areas of the plurality of images, and the display control device controls the display device to display the plurality of the overlap area images in an array.

In another embodiment, the display control device may control to the display device to display either of the overlap area images when the decision-of-framing detecting device detects that the imaging apparatus is fixed at a framing position. Preferably, the displayed overlap area image is switchable from one another in response to a switching command from a switching command input device, which may for example be operable by the user.

According to a preferred embodiment of the imaging apparatus of the present invention, the display device can display a stereoscopic image on the basis of the plurality of images, and the imaging apparatus has a stereoscopic display mode for displaying a stereoscopic image on the display device, and a three-dimensional information obtaining mode for obtaining three-dimensional information from the plurality of images, wherein the three-dimensional information represent spatial position of the subject in a predetermined spatial coordinate system. In this embodiment, the overlap area detecting device, the composite image producing device, and the overlap area image producing device are activated merely in the three-dimensional information obtaining mode but not in the stereoscopic display mode.

Another aspect of the present invention is a method of controlling an imaging apparatus having an imaging device that captures a plurality of images of a subject from different points of view.

According to the method of the present invention, an overlap area is detected from each of the plurality of images captured by the imaging device, the plurality of images overlapping with each other at the overlap areas; a wide angle composite image is produced from the plurality of images on the basis of a result of detection of the overlap areas, the composite image being composed of one overlap area and respective non-overlap areas other than the overlap areas of the plurality of images; the composite image is displayed as a moving image on a display device of the imaging apparatus; an overlap area image is produced from at least one of the plurality of images, the overlap area image corresponding to at least one of the overlap areas; and the display device is switched from the composite image to the overlap area image when it is determined that the imaging apparatus is fixed at a framing position.

According to the present invention, before the framing position is fixed, a composite image that shows not only an overlap area between a plurality of images but also non-overlap areas is displayed as a through-image, and once the framing position is fixed, the composite image is automatically switched to an overlap area image that shows only the overlap area. Thus, the user can frame the subject, taking advantage of the wider field of view provided by the composite image. The user can also confirm the overlap area in more detail with reference to the overlap area image. The present invention thus optimizes through-images before as well as after the decision of framing.

Detecting the movement of the imaging apparatus to determine automatically that the imaging apparatus is at a standstill and thus fixed at a framing position will permit switching the through-image automatically from the composite image to the overlap area image. Accordingly, the operability of the imaging apparatus is improved.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 8 is a flowchart illustrating a sequence of imaging processes in a pantoscopic camera according to another embodiment of the present invention, wherein an overlap area image is produced at a different time from a composite image;

FIG. 20 is a flowchart illustrating a sequence of imaging processes in the pantoscopic camera of FIG. 19.

DESCRIPTION OF THE PREFERRED EMBODIMENTS

Figure 1:
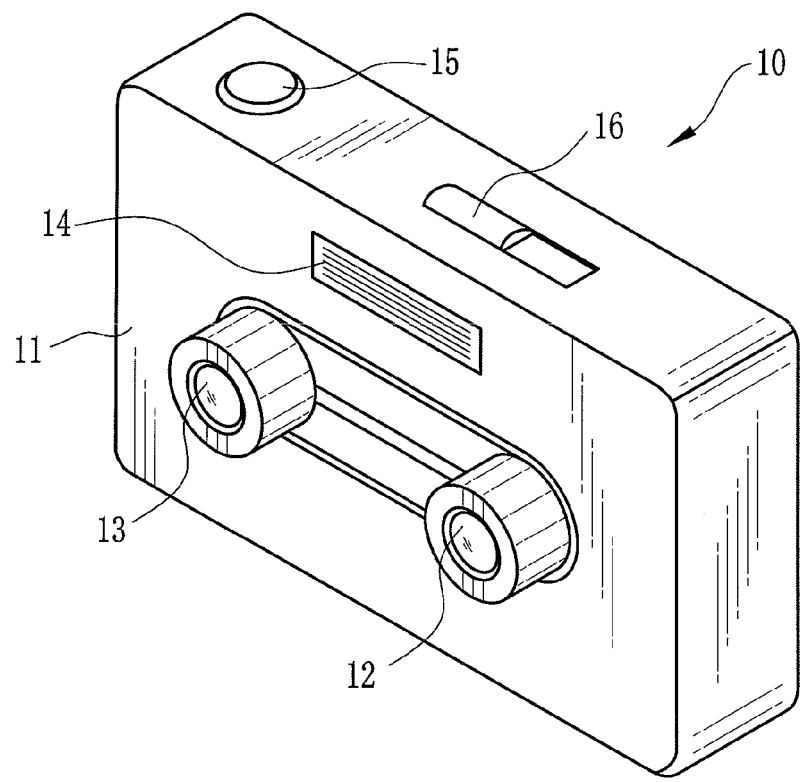
FIG. 1 is a front perspective view of a pantoscopic camera.

As shown in FIG. 1, a pantoscopic camera 10 captures a left viewpoint image (hereinafter called a left image) and a right viewpoint image (hereinafter called a right image) from a subject at different angles of view to obtain three-dimensional (3D) information on the subject. First and second imaging units 12 and 13 and a flash projector 14 are located on the front of a camera body 11. The imaging units 12 and 13 are horizontally spaced from each other such that respective optical axes of these imaging units are substantially parallel to or tilt apart from each other toward the object side. A shutter button 15 and a power switch 16 are disposed on the top of the camera body 11.

Figure 2:
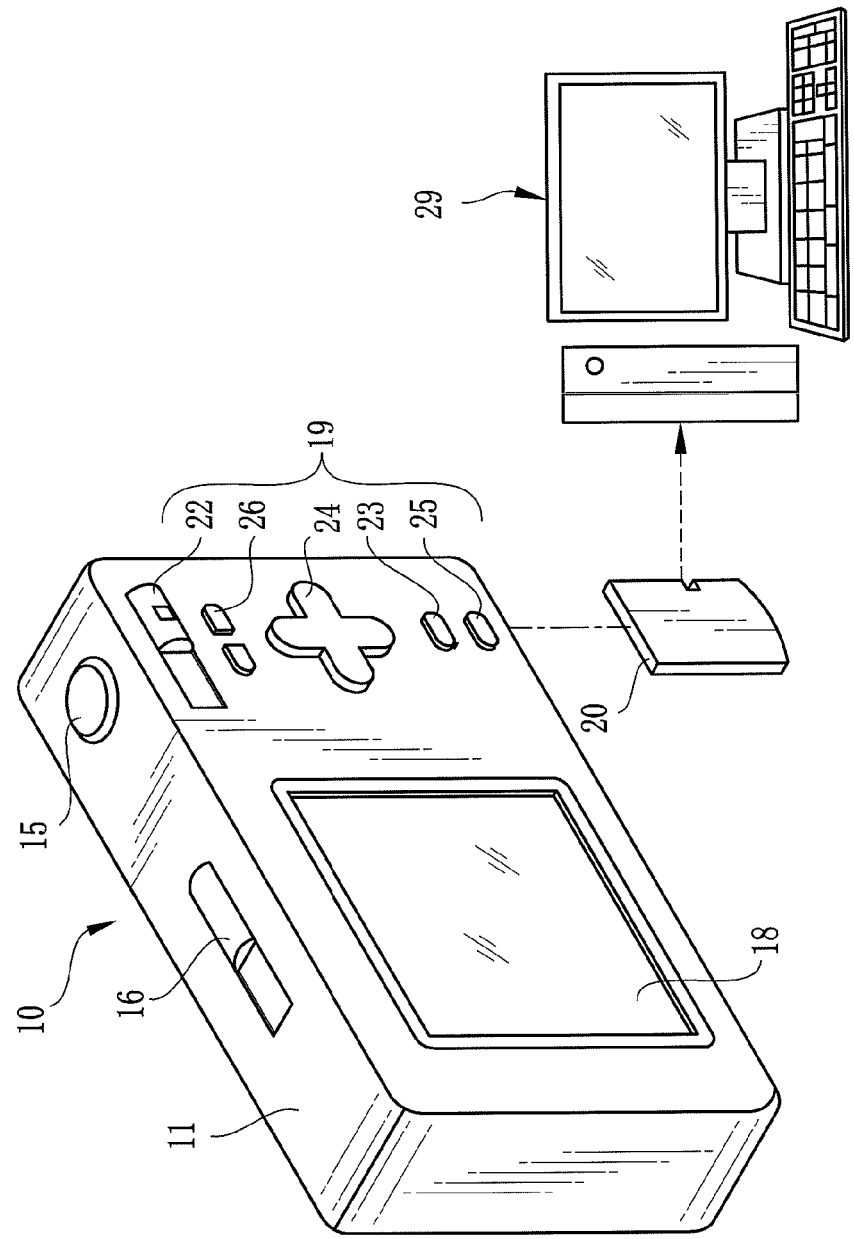
FIG. 2 is a rear perspective view of the pantoscopic camera of FIG. 1.

As shown in FIG. 2, a liquid crystal display device (LCD) 18 and an operating section 19 are placed on the back of the camera body 11. Although it is omitted from the drawings, a card slot for removably loading a memory card 20 and a lid for opening or closing the card slot are provided on the bottom of the camera body 11.

While the camera 10 is in standby for imaging, the LCD 18 serves as an electronic viewfinder displaying a through-image (or called live-view image). Note that the "through-image" is a moving image displayed on the LCD 18 at the instance when its images are captured at a predetermined frame rate by the imaging units 12 and 13. The LCD 18 can also display images reproduced on the basis of image data that has been recorded on the memory card 20.

The operating section 19 includes a mode switch 22, a menu button 23, a cursor shift key 24, an Enter key 25, a zoom button 26 etc. The mode switch 22 is operated to switch over operation modes of the pantoscopic camera 10. The operation modes include a still image capturing mode for capturing a still image, and a normal reproduction mode for reproducing and displaying captured images on the LCD 18.

The menu button 23 may be operated for the pantoscopic camera 10 to display a menu screen or a setup screen on the LCD 18. The cursor shift key 24 may be operated to shift a cursor on the menu screen or the setup screen. The Enter key 25 may be operated to fix setup conditions of the camera. The zoom button 26 is operated for zooming, i.e., to change the magnification of a taking lens 37 (see FIG. 3) toward a wide-angle side or a telephoto side.

The memory card 20 stores right image data and left image data of a subject as captured by the first and second imaging units 12 and 13 in the still image capturing mode. After the completion of an imaging session, the memory card 20 is unloaded from the pantoscopic camera 10, and is set in a 3D information obtaining apparatus 29.

The 3D information obtaining apparatus 29 carries out the above-mentioned distance calculation based on the right and left image data from the pantoscopic camera 10, to obtain 3D information of the subject. For example, the 3D information obtaining apparatus 29 may be a personal computer installed with an application program for the distance calculation.

Figure 3:
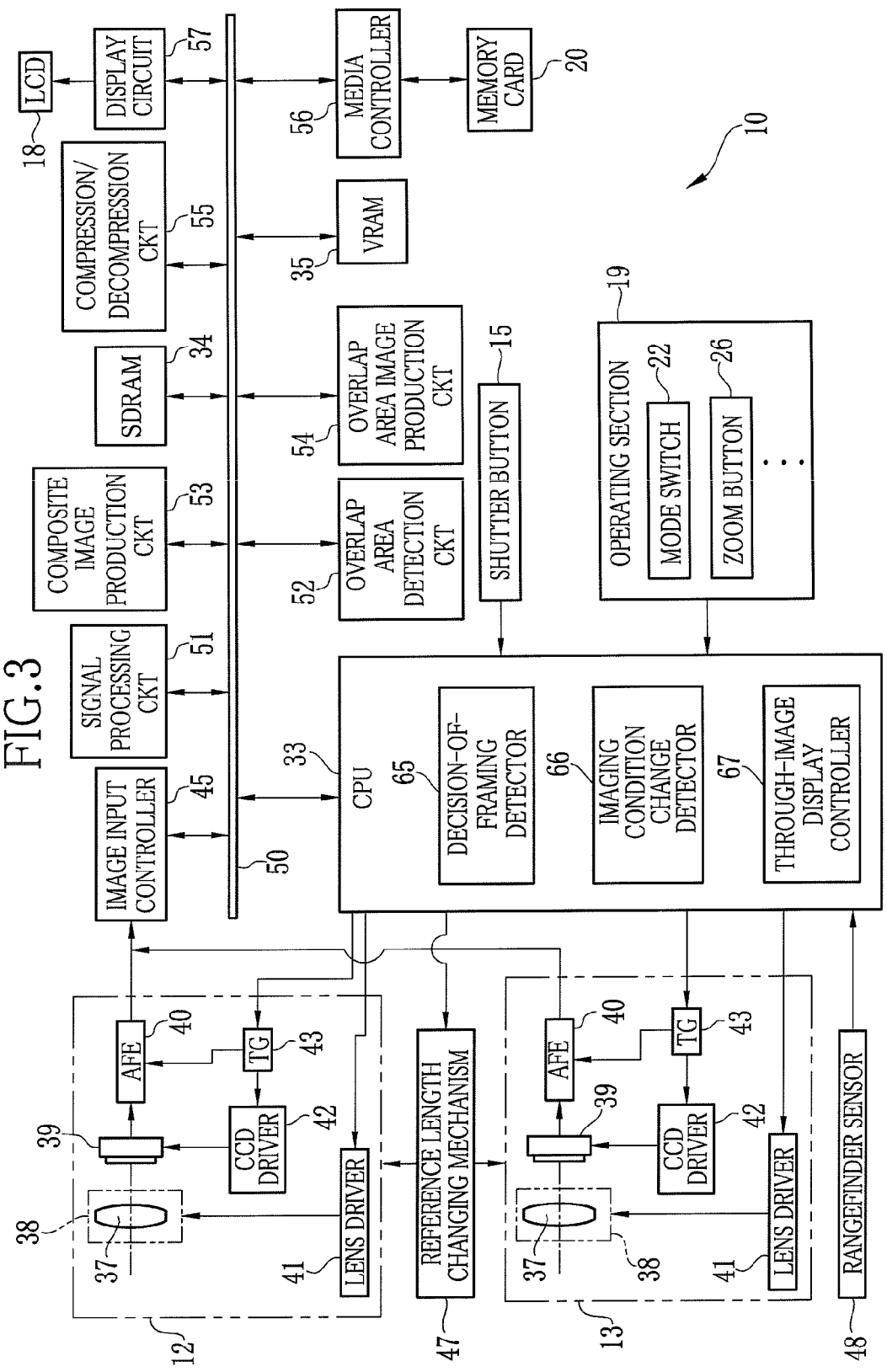
FIG. 3 is a block diagram illustrating the circuitry of the pantoscopic camera of FIG. 1.

Referring to FIG. 3, a CPU 33 totally controls respective components of the pantoscopic camera 10 by executing various programs and data as read out from a not-shown ROM in response to input signals from the shutter button 15 and the operating section 19.

SDRAM 34 serves as a work memory for the CPU 33 to execute the processing. VRAM 35 includes a through-image memory area capable of storing successive two fields of image data, to store temporarily image data for displaying the through-image.

The first imaging unit 12 includes a lens unit 38 having the taking lens 37 incorporated therein, a CCD image sensor (hereinafter referred to simply as CCD) 39, and an AFE (analog front end circuit) 40. The CCD may be replaced with a MOS type image sensor.

Although it is not shown in the drawing, zooming, focusing and stopping mechanisms are also incorporated in the lens unit 38. The zooming mechanism is to move the taking lens 37 for zooming. The focusing mechanism is to move a focus lens, which is included in the taking lens 37, to focus the taking lens 37 on a subject. The stopping mechanism adjusts a not-shown stop aperture to control the intensity of light that travels from the subject and falls onto the CCD 39. These operations of the zooming, focusing and stopping mechanisms are controlled via a lens driver 41 by the CPU 33.

The CCD 39 has a photoreceptive surface on which a large number of photodiodes are arranged in an array. The photoreceptive surface is located behind the taking lens 37, so that the light from the subject entering through the taking lens 37 is converted to an electronic image signal. The CCD 39 is connected to a CCD driver 42 that is controlled by the CPU 33. The CCD driver 42 is driven by synchronizing pulses from a timing generator (TG) 43, to control charge-storage time and charge-readout timing of the CCD 39.

The image signal output from the CCD 39 is fed to the AFE 40, which consists of a correlated double sampling (CDS) circuit, an automatic gain control (AGC) amplifier, and an A/D converter. Being supplied with the synchronizing pulses from the TG 43, the AFE 40 operates in synchronism with the reading and transferring operation of the charges from the CCD 39. The CDS circuit reduces noises from the image signal through correlated double sampling. The AGC amplifier amplifies the image signal at a gain corresponding to the sensitivity of the imaging unit 12, as determined by the CPU 33. The A/D converter converts the analog image signal from the AGC to a digital left image signal, and outputs the digital left image signal to an image input controller 45.

The second imaging unit 13 has the same structure as the first imaging unit 12, and outputs a digital right image signal to the image input controller 45.

A reference length changing mechanism 47 can change the spacing between the imaging units 12 and 13 in response to a control command from the CPU 33, and thus, the distance between the optical axes of the imaging units 12 and 13, which may be called the reference length. A rangefinder sensor 48, which consists of a light projector and a photo sensor, measures a distance from the camera 10 to a subject and outputs subject distance data to the CPU 33.

The CPU 33 is connected via a bus 50 to the SDRAM 34, the VRAM 35, the image input controller 45, a signal processing circuit 51, an overlap area detection circuit 52, a composite image production circuit 53, an overlap area image production circuit 54, a compression/decompression circuit 55, a media controller 56, a display circuit 57 etc.

The image input controller 45 has a buffer memory of a predetermined capacity for storing the right and left image signals from the imaging units 12 and 13 to the extent that the stored right and left image signals constitute one frame each.

Then, the image input controller 45 outputs the right and left image signals frame by frame to the signal processing circuit 51.

The signal processing circuit 51 processes the right and left image signals from the image input controller 45 with various image-processing procedures, such as gradation conversion, white-balance correction and gamma correction and Y/C conversion, to produce a pair of image data frames corresponding to a pair of right and left images, which are then stored in the SDRAM 34.

Figure 4:
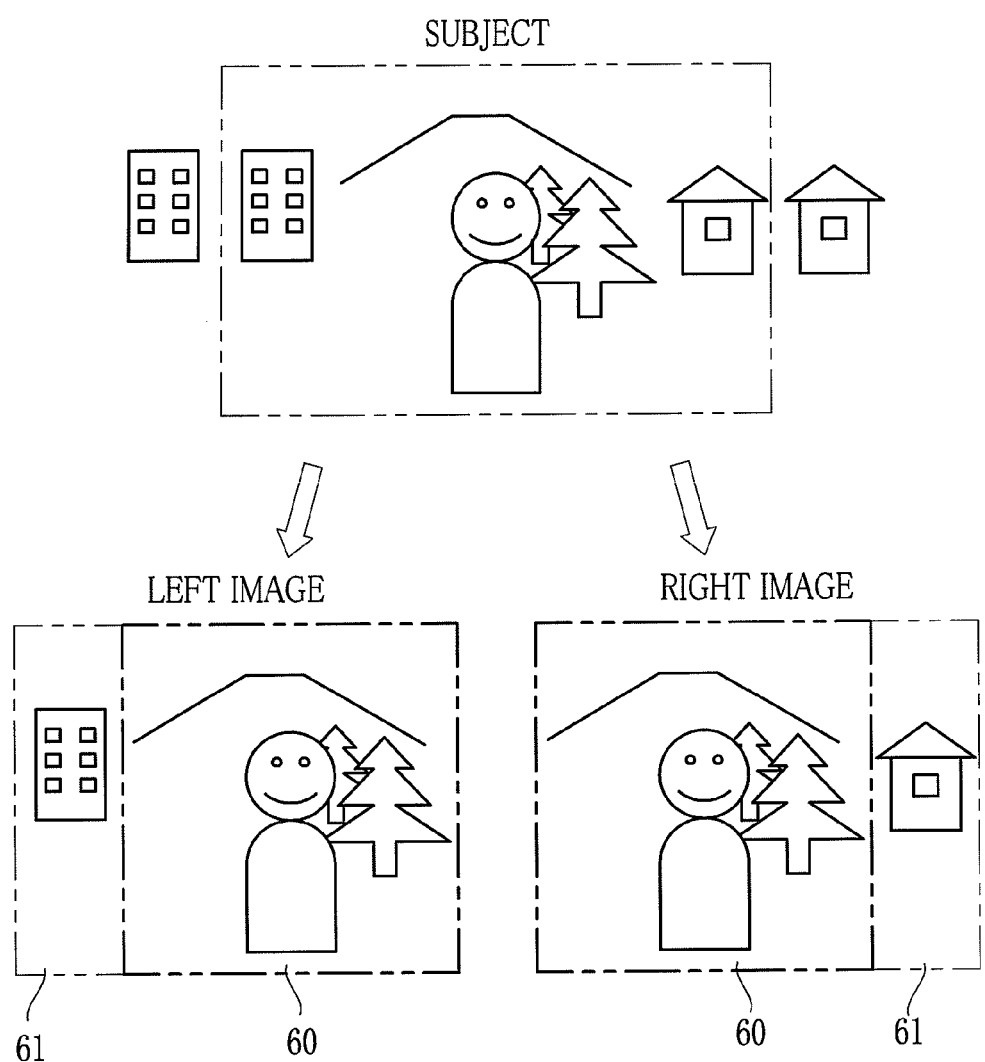
FIG. 4 is an explanatory diagram illustrating overlap areas of a pair of right and left images.

Referring to FIG. 4, the overlap area detection circuit 52 detects overlap areas 60 between the right and left images corresponding to the right and left image data stored in the SDRAM 34 under the control of the CPU 33. The overlap areas 60 can be definitely determined by the reference length, i.e. the spacing between the imaging units 12 and 13, in combination with the zoom ratio and other parameters. The overlap area detection circuit 52 is previously provided with correlation data that correlates these parameters to variable ranges of the overlap areas 60. Therefore, the overlap area detection circuit 52 refers to the correlation data to determine the overlap areas 60 of the right and left images. Note that reference numerals 61 refer to non-overlap areas of the right and left images.

Back to FIG. 3, the composite image production circuit 53 is actuated when the operation mode of the pantoscopic camera 10 is set to the image capturing mode. The composite image production circuit 53 produces a wide-angle composite image (see FIG. 6) from the right and left image data stored in the SDRAM 34 by combining one of the right and left images, for example the left image, with the non-overlap areas 61 of the other image under the control of the CPU 33. The composite image thus consists of the overlap areas 60 of the left image and the respective non-overlap areas 61 of right and left images.

The composite image production circuit 53 sequentially stores the produced composite image data in the VRAM 35 until the shutter button 15 is half-pressed. While the shutter button 15 is kept half-pressed, the composite image production circuit 53 discards the last composite image data every time new composite image data is produced.

Moreover, the composite image production circuit 53 carries out cropping/trimming process of the composite image so that the aspect ratio of the composite image coincides with the aspect ratio of the LCD 18 screen, in producing the composite images. The composite image production circuit 53 also composes framing data in the composite image data for displaying a frame or border line 70 to confine the overlap area 60.

The overlap area image production circuit 54 produces an overlap area image data corresponding to the overlap area 60 of either of the right and left images based on the right and left image data stored in the SDRAM 34 under the control of the CPU 33. The overlap area image production circuit 54 sequentially stores the produced overlap area image data in the VRAM 35 while the shutter button 15 is kept half-pressed. During the rest of the time, the overlap area image production circuit 54 discards the last overlap area image data every time new overlap area image data is produced.

When the shutter button 15 is pressed down, the compression/decompression circuit 55 compresses data of the uncompressed right and left images stored in the VRAM 35 to produce the compressed right and left image data in a predetermined file format. In this case, lossless compression is preferable. Because the 3D information obtaining apparatus 29 determines the correlation of respective pixels between the right and left images by a matching method such as pattern matching or stereo matching, in carrying out the above-mentioned distance calculation, if the right and left image data is compressed through lossy compression such as JPEG, it will cause some errors in the matching result.

In reproducing images, the compression/decompression circuit 55 also decompresses the compressed right and left image data recorded in the memory card 20 to produce the uncompressed right and left image data. The media controller 56 records and reads the image data to the memory card 20.

The display circuit 57 processes the composite image data read out from the VRAM 35, the overlap areas image data, or the uncompressed right and left image data as decompressed in the compression/decompression circuit 55, to produce a signal for displaying images, and outputs the signal to the LCD 18 at a constant timing. Thus, in the image capturing mode, the composite image or the overlap areas image is displayed on the LCD 18 as the through-image. In the reproduction mode, on the other hand, the right and left images read out from the memory card 20 are displayed on the LCD 18.

The CPU 33 serves as a decision-of-framing detector 65, an imaging condition change detector 66 and a through-image display controller 67 by sequentially carrying out various programs read out from the ROM. These respective sections operate in the image capturing mode.

The decision-of-framing detector 65 determines that the framing position for recording image data of the subject is fixed when the shutter button 15 is half-pressed. Because the half-pressing operation is usually done after the framing position is fixed, whether the framing position is fixed or not may be determined by observing the operation condition of the shutter button 15. When the decision-of-framing detector 65 determines that the framing position is fixed, it outputs a decision-of-framing signal to the through-image display controller 67.

The imaging condition change detector 66 detect a change in imaging conditions of the pantoscopic camera 10, more specifically, a change in range of the overlap areas 60. The imaging conditions include the reference length, the focal length and the distance between the subject and the pantoscopic camera 10 (hereinafter called the subject distance). A change of the reference length can be detected by the operation of the reference length changing mechanism 47. A change in the focal length can be detected by the operation of a zooming mechanism of the lens unit 38. A change in subject distance can be detected on the basis of rangefinder data from the rangefinder sensor 48. When the imaging condition change detector 66 detects a change of the imaging conditions, it outputs a change detection signal to the through-image display controller 67.

The through-image display controller 67 totally controls respective circuits related to the through-image display such as the overlap area detection circuit 52, the composite image production circuit 53, the overlap area image production circuit 54 and the display circuit 57. When the operation mode of the pantoscopic camera 10 is switched to the image capturing mode and the through-image display controller 67 receives the change detection signal from the imaging condition change detector 66, the through-image display controller 67 actuates the overlap area detection circuit 52 to carry out the detection of the overlap areas 60.

Every time new image data of the right and left images is written in the SDRAM 34, the through-image display controller 67 operates the composite image production circuit 53 and the overlap area image production circuit 54 according to the latest detection result of the overlap areas 60 obtained at the overlap area detection circuit 52. Through these operations, the composite image data and the overlap area image data are produced and stored, and the previously stored image data is discarded. Moreover, every time new composite image data or new overlap area image data is stored in the VRAM 35, the through-image display controller 67 controls the display circuit 57 to display the through-images on the LCD 18.

Now the sequence of imaging processes in the pantoscopic camera 10 with the above-described structure will be described with reference to the flowchart in FIG. 5. Upon the power switch 16 being turned on, the CPU 33 is loaded with a control program from the ROM, to start controlling the operation of the pantoscopic camera 10.

When the mode switch 22 is operated to set the pantoscopic camera 10 to the image capturing mode, optical images formed through the respective taking lenses 37 of the imaging units 12 and 13 are converted to electronic images through the CCDs 39, and then to digital image signals through the AFE 40. The right and left image signals from the imaging units 12 and 13 are fed to the signal processing circuit 51 via the image input controller 45, to be processed appropriately to produce a pair of right and left image data frames. The right and left image data frames are stored in the SDRAM 34.

After writing the pair of right and left image data frames, the through-image display controller 67 of the CPU 33 outputs an overlap area detection command to the overlap area detection circuit 52. Upon this command, the overlap area detection circuit 52 detects the overlap area 60 from each of the right and left image data frames as written in the SDRAM 34, and sends a detection result to the through-image display controller 67.

Upon receipt of the overlap area detection result, the through-image display controller 67 sends the overlap area detection result to the composite image production circuit 53 and the overlap area image production circuit 54. At the same time, the through-image display controller 67 outputs a composite image production command to the composite image production circuit 53, as well as an overlap area image production command to the overlap area image production circuit 54. Upon this command, the composite image production circuit 53 obtains a copy of the right and left image data from the SDRAM 34.

Figure 6A:
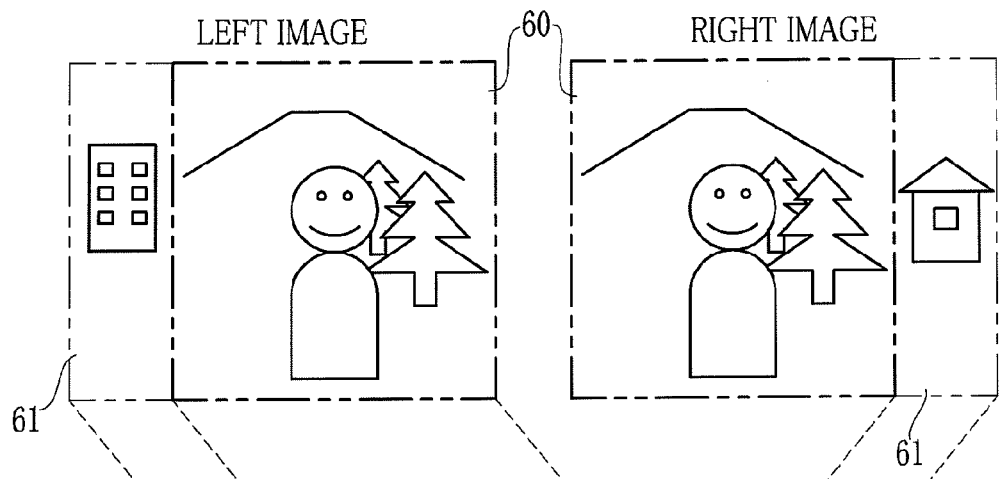
FIG. 6 is an explanatory diagram illustrating a process of producing a composite image.
Figure 6B:
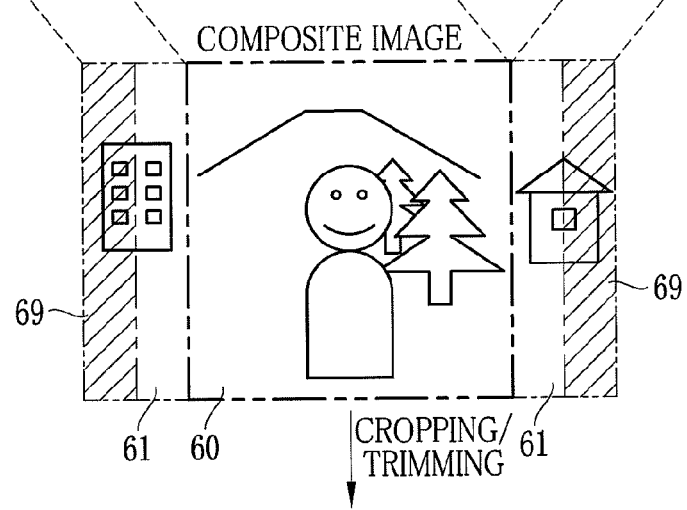

Then, as shown in FIG. 6A, the composite image production circuit 53 determines the non-overlap areas 61 of the right image according to the overlap area detection result obtained from the through-image display controller 67, to crop the non-overlap areas 61 from the right image. Next, the composite image production circuit 53 synthesizes the left image with the non-overlap areas 61 of the right image. Thus, as shown in FIG. 6B, a composite image is produced. Contrary to the explanation of FIGS. 6A and 6B, it is possible to produce a composite image by combining the right image with the non-overlap areas 61 cropped from the left image. Other image composition methods than the above-described methods may use for producing composite images.

Figure 6C:
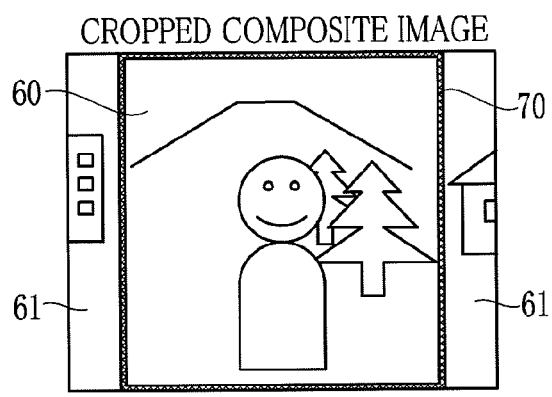

After producing the composite image, the composite image production circuit 53 compares the aspect ratio of the composite image with the predetermined aspect ratio of the LCD 18 screen. When these ratios differ from each other, the composite image production circuit 53 crops a fragment of each non-overlap area 61 on either side of the composite image, a trimming area 69 hatched in FIG. 6B, so as to equalize the both aspect ratios. Thus, the composite image of the aspect ratio corresponding to the LCD 18 screen is produced, as shown in FIG. 6C.

The composite image production circuit 53 also synthesizes the cropped composite image data with the framing data for displaying the framing window 70 to show the overlap area 60 on the basis of the previously obtained overlap area detection result. Hereby, the composite image production circuit 53 completes the production of the composite image data.

Figure 5:
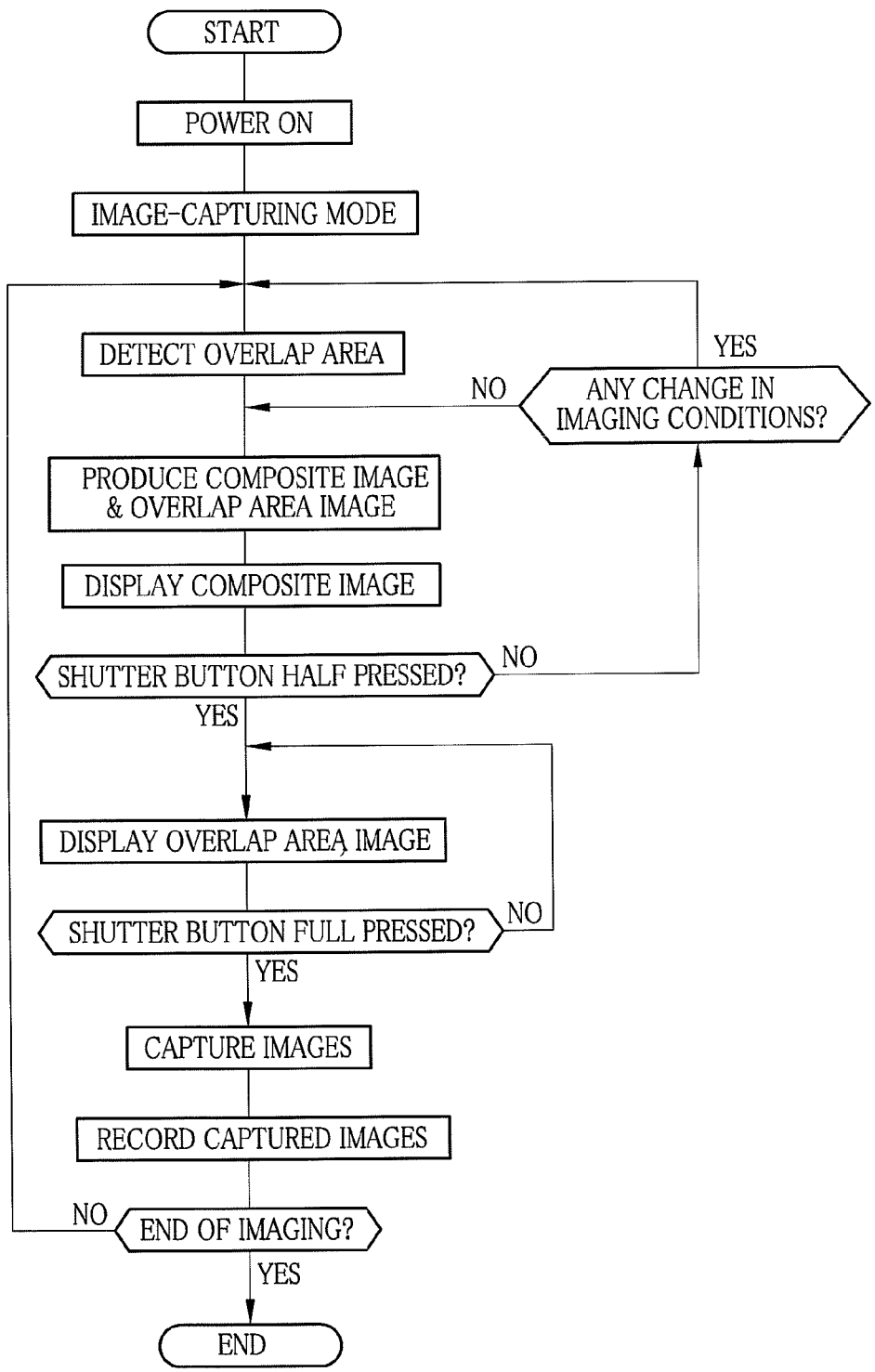
FIG. 5 is a flowchart illustrating a sequence of imaging processes in the pantoscopic camera according to an embodiment of the present invention.

Back to FIG. 5, upon receipt of the overlap area image production command, the overlap area image production circuit 54 produces the overlap area image data corresponding to the overlap area 60 of either of the right and left images stored in the SDRAM 34.

After the composite image data and the overlap area image data are thus produced, if no decision-of-framing signal is fed from the decision-of-framing detector 65, the through-image display controller 67 sends an image storing command to the composite image production circuit 53. Upon this command, the composite image production circuit 53 stores the produced composite image data in the VRAM 35.

Next, the through-image display controller 67 sends a through-image display command to the display circuit 57. Upon receipt of this command, the display circuit 57 reads out the composite image data from the VRAM 35 and displays the composite image 71 (see FIG. 7A) as the through-image on the LCD 18 based on the composite image data.

Until the shutter button 15 is half-pressed, the above-described processing for displaying the composite image 71 continues. When no change detection signal is inputted from the imaging condition change detector 66 after the new right and left image data frames are stored in the SDRAM 34, the through-image display controller 67 makes the composite image production circuit 53 and the overlap area image production circuit 54 produce the composite image and the overlap area image respectively on the basis of the previously detected overlap area detection result. So long as no change occurs in the imaging conditions which will result in changing the overlap areas 60, there is no problem in producing the composite image and the overlap area image on the basis of the previously detected overlap area detection result.

On the other hand, in case that the reference length changes in cooperation with the reference length changing mechanism 47, that the focal distance changes in cooperation with the zooming mechanism of the lens unit 38, or that the subject distance changes corresponding to the subject distance data fed from the rangefinder sensor 48, the imaging condition change detector 66 outputs the change detection signal to the through-image display controller 67. In response to the change detection signal, the through-image display controller 67 carries out the above-described overlap area detection process, composite image production process and overlap area image production process.

When the shutter button 15 is half-pressed, imaging preparation process such as focusing and exposure control is carried out. At the same time the decision-of-framing detector 65 sends the decision-of-framing signal to the through-image display controller 67. Upon receipt of the decision-of-framing signal, the through-image display controller 67 stops sending an image storing command to the composite image production circuit 53 and sends it to the overlap area image production circuit 54. Upon the image storing command, the overlap area image production circuit 54 stores the produced overlap area image data in the VRAM 35. Next, the display circuit 57 reads out the overlap area image data from the VRAM 35 and reproduces as a through-image an overlap area image 72 (see FIG. 7B) on the basis of the overlap area image data, in an enlarged size suited for the LCD 18 screen.

Figure 7A:
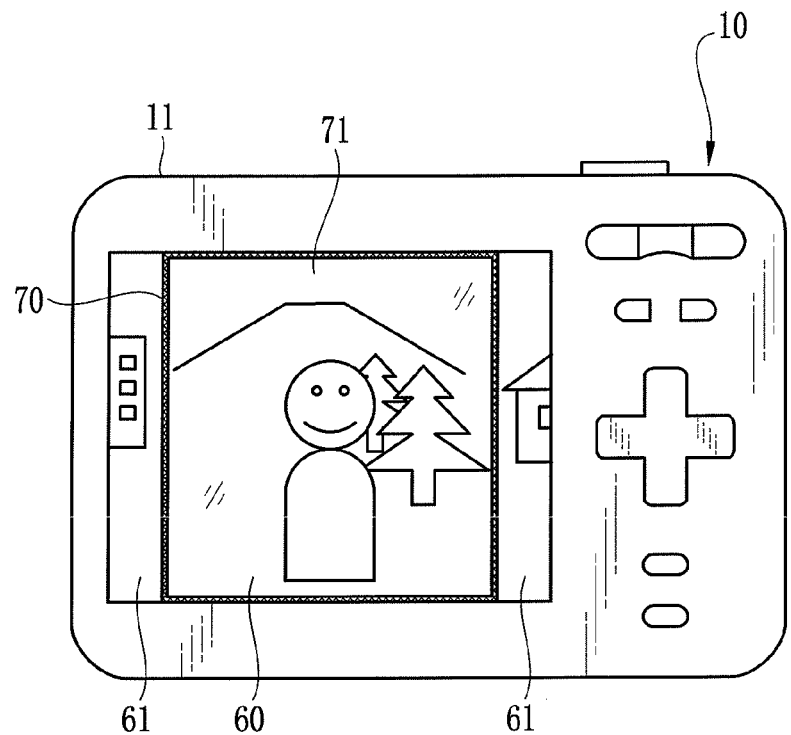
FIGS. 7A and 7B are explanatory diagrams illustrating switching between a composite image and an overlap area image.
Figure 7B:
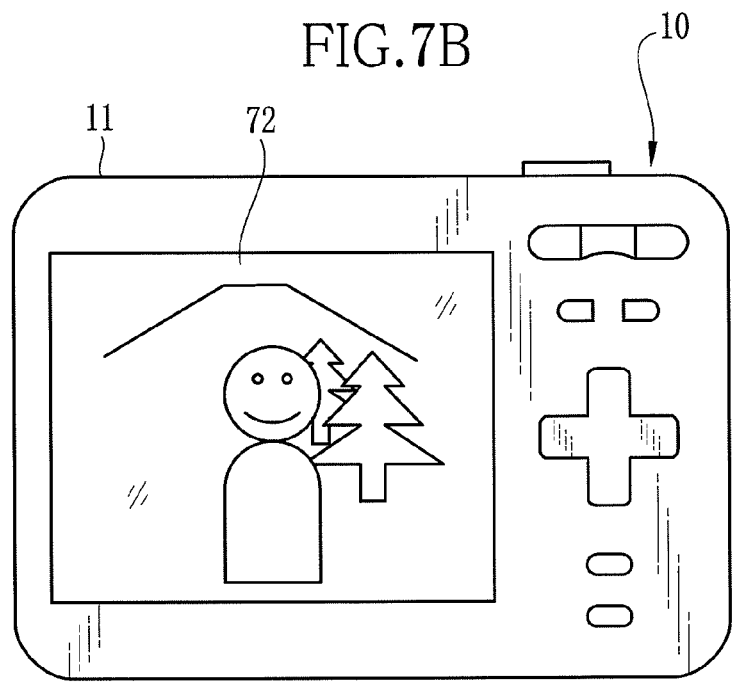

As shown in FIGS. 7A and 7B, the operation of half-pressing the shutter button 15 switches the display of the LCD 18 from the composite image 71 to the enlarged overlap area image 72. Before the shutter button 15 is half-pressed, the composite image 71 is displayed as the through-image. As the through-image shows a wide field, it is easier for the user to decide the framing position. Also because the framing window 70 is displayed on the composite image 71 to indicate the overlap area 60, the user can easily perceive the overlap area 60.

Because the overlap area image 72 is enlarged to be the through-image after the shutter button 15 is half-pressed, the user can check the overlap area image 72 in more detail for confirmation after deciding the framing position. Thus, the through-image is displayed inmost suitable ways before and after the decision-of-framing.

Responding to the full-pressing operation of the shutter button 15, imaging the subject is executed. The first and second imaging units 12 and 13 respectively output the image signals of a pair of the right and left images. The signal processing circuit 51 processes the image signal into the right and left image data frames and write them in the SDRAM 34. The right and left image frames are lossless-compressed at the compression/decompression circuit 55 and then recorded in the memory card 20 via the media controller 56. Thereafter, while the image capturing mode is set, the above-described processing sequence is repeatedly executed.

According to the above-described first embodiment, the overlap area image data is produced at the overlap area image production circuit 54 even before the shutter button 15 is half-pressed. Alternatively, as shown for example in FIG. 8, it is possible to produce the overlap area image data when the shutter button 15 is half-pressed. In the above-described first embodiment, the overlap area image 72 is enlarged to the full screen size of the LCD 18. However, the enlargement of the overlap area image 72 is not mandatory.

Next, another embodiment of the present invention will be described with reference to FIG. 9. In an above-described first embodiment, non-overlap areas 61 of a composite image are partly trimmed. In the second embodiment shown in FIG. 9, a composite image 71 includes the whole non-overlap areas 61. Other structures of the second embodiment may be the same as the pantoscopic camera 10 of the above-described first embodiment, so the description and illustration of the same structures will be omitted.

Figure 9:
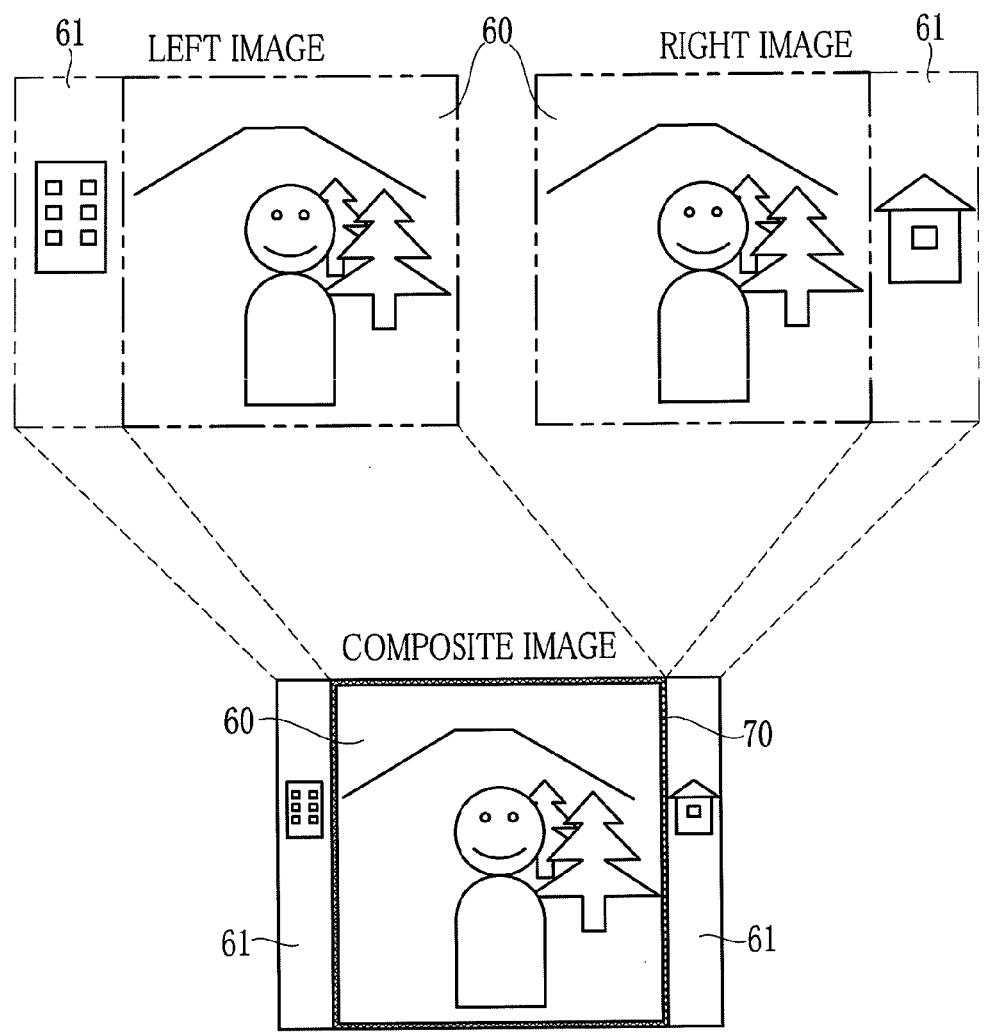
FIG. 9 is an explanatory diagram illustrating still another embodiment of the present invention, wherein the entire area captured by a pantoscopic camera, including non-overlap areas, is displayed as a composite image.

As shown in FIG. 9, the non-overlap areas 61 of right and left images are respectively compressed on the basis of the size of the overlap areas 60, the size of the non-overlap areas 61, and the size and aspect ratio of a LCD 18 screen so that a composite image 72 displayed on the LCD 18 contains the whole non-overlap areas 61. Then, the composite image 72 is produced in the same manner as above. To compress the non-overlap areas 61, various methods are usable, including ordinary size-reduction and pixel-thinning. The composite image 72 contains the whole overlap area 60 in the same manner as the first embodiment. Note that it is possible to carryout the compression of the non-overlap areas 61 after combining the right and left images into a composite image.

Figure 10:
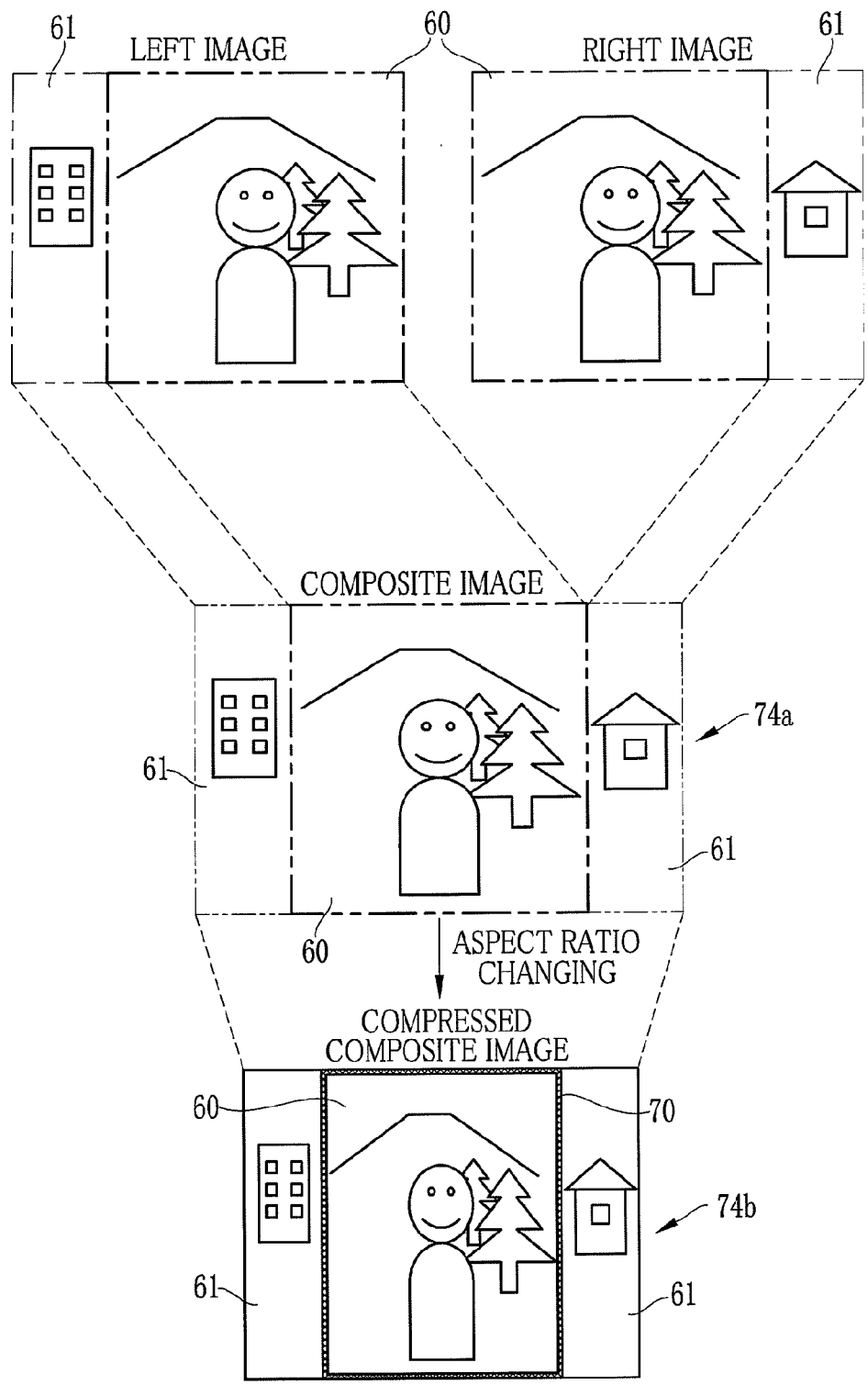
FIG. 10 is an explanatory diagram illustrating a further embodiment of the present invention, which is similar to the embodiment of FIG. 9, but a composite image is composed and displayed in a different manner.

Instead of compressing merely the non-overlap areas 61, in an embodiment shown in FIG. 10, a composite image 74a as the whole may be compressed on the basis of the size of the composite image 74a and the size and aspect ratio of the LCD 18 screen, so as to change the aspect ratio of the composite image so that the whole area of a compressed composite image 74b can be displayed on the LCD 18. In this embodiment, the overlap area 60 is also compressed unlike the embodiment of FIG. 9. To change the aspect ratio, known methods are usable.

Next, a pantoscopic camera 75 in accordance with another embodiment of the present invention will be described with reference to FIG. 11. In an above-described first embodiment, it is determined that the framing position is fixed when a shutter button 15 is half-pressed. In the case of the pantoscopic camera 75, on the other hand, it is determined that the framing position is fixed when the pantoscopic camera 75 is at a standstill.

The pantoscopic camera 75 may basically have the same structure as the pantoscopic camera 10 of the first embodiment or the embodiment shown in FIG. 9. The difference is in that the pantoscopic camera 75 is provided with an acceleration sensor 76 and that a CPU 33 serves as a decision-of-framing detector 77 that is different from the decision-of-framing detector 65 of the first embodiment.

For example, the acceleration sensor 76 detects acceleration of the camera 75 with respect to three-dimensional axes and outputs acceleration signals showing the detection results to the CPU 33. The decision-of-framing detector 77 is provided with a standstill determiner 78. The decision-of-framing detector 77 determines that the framing position is fixed when the standstill determiner 78 determines that the pantoscopic camera 75 comes to a standstill.

The standstill determiner 78 determines that the pantoscopic camera is moving so long as the acceleration signals are fed from the acceleration sensor 76, and determines that the pantoscopic camera pauses when the acceleration signals stop. When pantoscopic camera 75 substantially comes to a standstill, the display of a LCD 18 switches from a composite image 71 to an enlarged overlap area image 72. The decision-of-framing is thus detected automatically, making the operation easier for the user.

Figure 12:
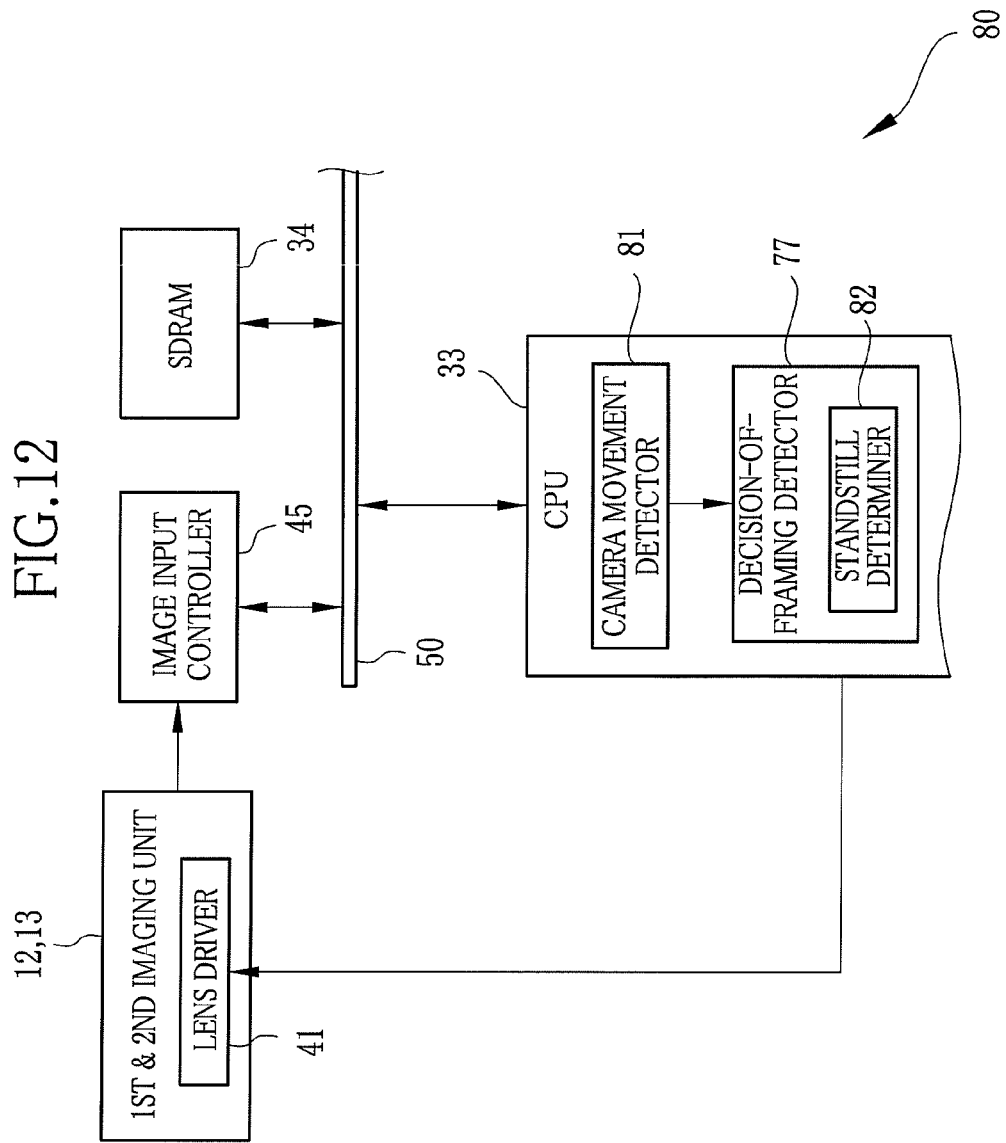
FIG. 12 is a block diagram illustrating the circuitry of a pantoscopic camera in accordance with still another embodiment of the present invention, which determines whether the framing position is fixed or not on the basis of differences between images captured successively.

Next, a pantoscopic camera 80 in accordance with another embodiment of the present invention will be described with reference to FIG. 12. The pantoscopic camera 80 determines whether the framing position is fixed or not on the basis of right and left image data sequentially stored in SDRAM 34.

Figure 11:
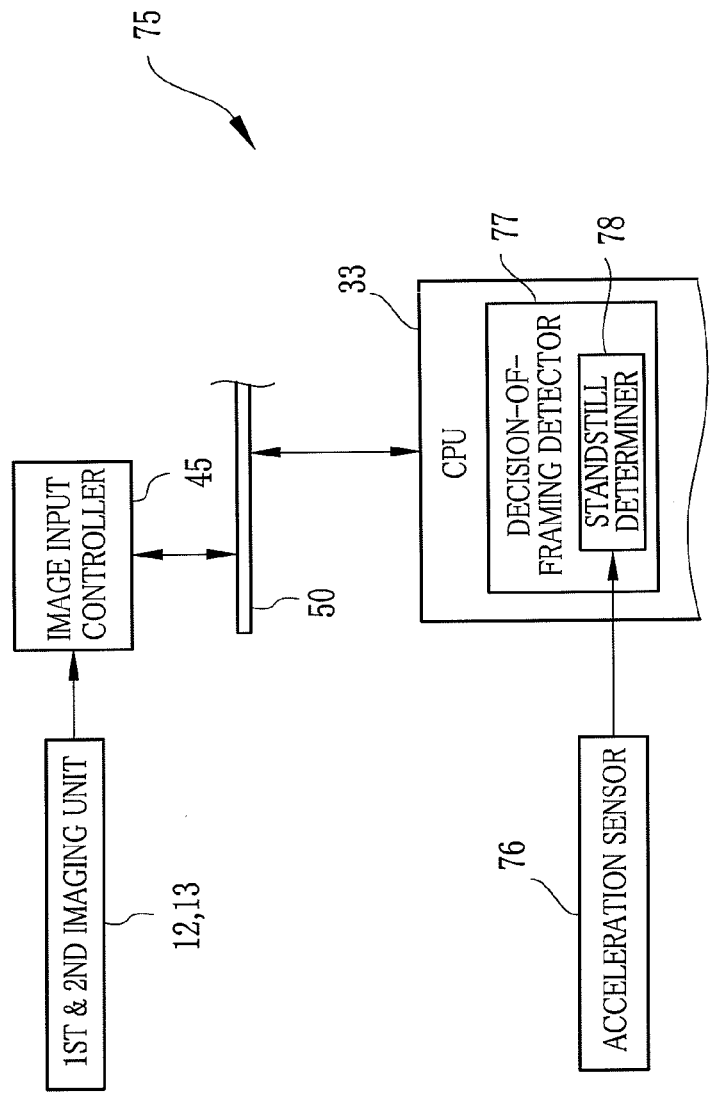
FIG. 11 is a block diagram illustrating the circuitry of a pantoscopic camera in accordance with another embodiment of the present invention, which determines that the framing position is fixed when the camera is at a standstill.

The pantoscopic camera 80 basically has the same structure as the pantoscopic camera 75 of FIG. 11, but a CPU 33 in the pantoscopic camera 80 also serves as a camera movement detector 81. A decision-of-framing detector 77 of the camera 80 is provided with a standstill determiner 82 that is different from the standstill determiner 78 of the embodiment shown in FIG. 11.

The camera movement detector 81 detects a shift amount between two successive left image data frames (or right image data frames) among those sequentially written in the SDRAM 34. Specifically, the camera movement detector 81 may detect the shift amount between two successive image data frames through a known matching method such as block matching or tree search method, by matching feature points between two images. During the image capturing mode, the camera movement detector 81 sequentially supplies the decision-of-framing detector 77 with the detected shift amounts as data indicating the camera movement.

The standstill determiner 82 determines that the pantoscopic camera 80 is at a standstill when the shift amount from the camera movement detector 81 is below a threshold level. This threshold level is variable depending upon the zoom position of a taking lens 37. Monitoring the operation of a zooming mechanism of a lens unit 38, the standstill determiner 82 raises the threshold level as the zoom position of the taking lens 37 gets closer to a telephoto side, or lowers the threshold level as the zooming position of the taking lens 37 gets closer to a wide-angle side. In one embodiment, the threshold level may be adjusted with reference to a data table which correlates zoom positions of the taking lens 37 with predetermined threshold levels.

Figure 13:
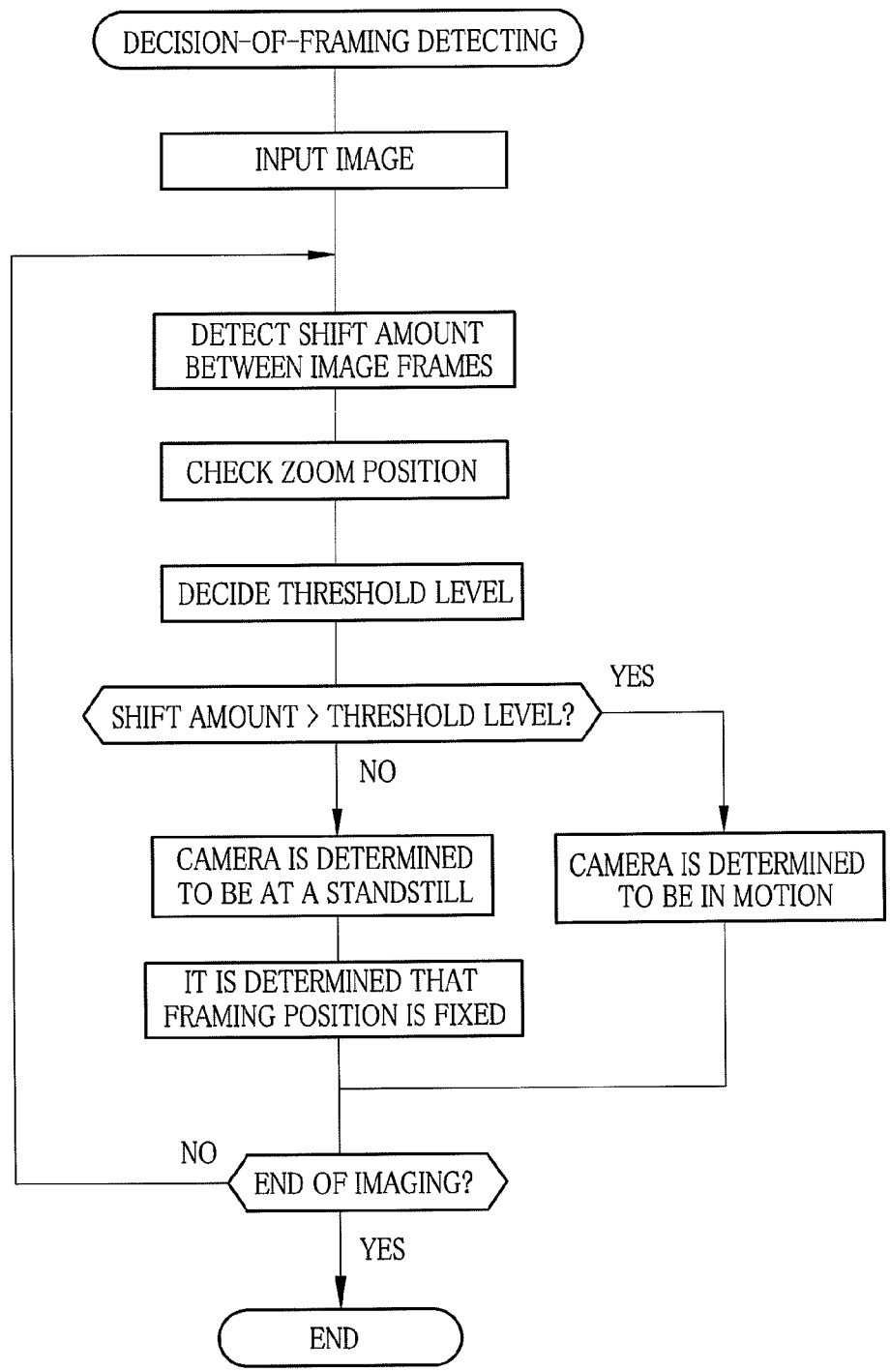
FIG. 13 is a flowchart illustrating a sequence of imaging processes in the pantoscopic camera of FIG. 12.

Referring now to the flowchart shown in FIG. 13, the process of detecting the decision of framing at the pantoscopic camera 80 will be described. The camera 80 may operate in the same manner as the above-described first embodiment except for the method of detecting the decision of framing. Therefore, the following explanation will relate only to the different features of the camera 80 from other embodiments.

During the image capturing mode, the right and left image data frames are sequentially written in the SDRAM 34. Every time a new left image data frame is written in the SDRAM 34, the camera movement detector 81 calculates a shift amount between the new left image data frame and a left image data frame stored one frame before the new one, to output the result of calculation to the decision-of-framing detector 77. Upon receipt of the calculated shift amount, the decision-of-framing detector 77 activates the standstill determiner 82.

The standstill determiner 82 determines the threshold level for the shift amount depending upon the zoom position of the taking lens 37, and compares the shift amount with the determined threshold level. When the calculated shift amount representative of a camera movement is greater than the determined threshold level, the standstill determiner 82 determines that the pantoscopic camera 80 is moving. When the calculation result from the camera movement detector 81 is smaller than the threshold, the standstill determiner 82 determines that the pantoscopic camera 80 is at a standstill. As a matter of fact, while the taking lens 37 is on the telephoto side, even a little movement of the pantoscopic camera 80 results in a relatively great shift amount. However, because the threshold level sets higher as the zoom position gets closer to the telephoto side, it is possible to determine that the pantoscopic camera 80 comes to a standstill even on the telephoto side.

The decision-of-framing detector 77 determines that the framing position is fixed when the standstill determiner 82 determines that the pantoscopic camera 80 is at a standstill. Thus, when the pantoscopic camera 80 substantially comes to a standstill, the display of a LCD 18 switches from a composite image 71 to an enlarged overlap area image 72 in the same manner as the third embodiment, achieving the same effect as in the third embodiment.

Figure 14:
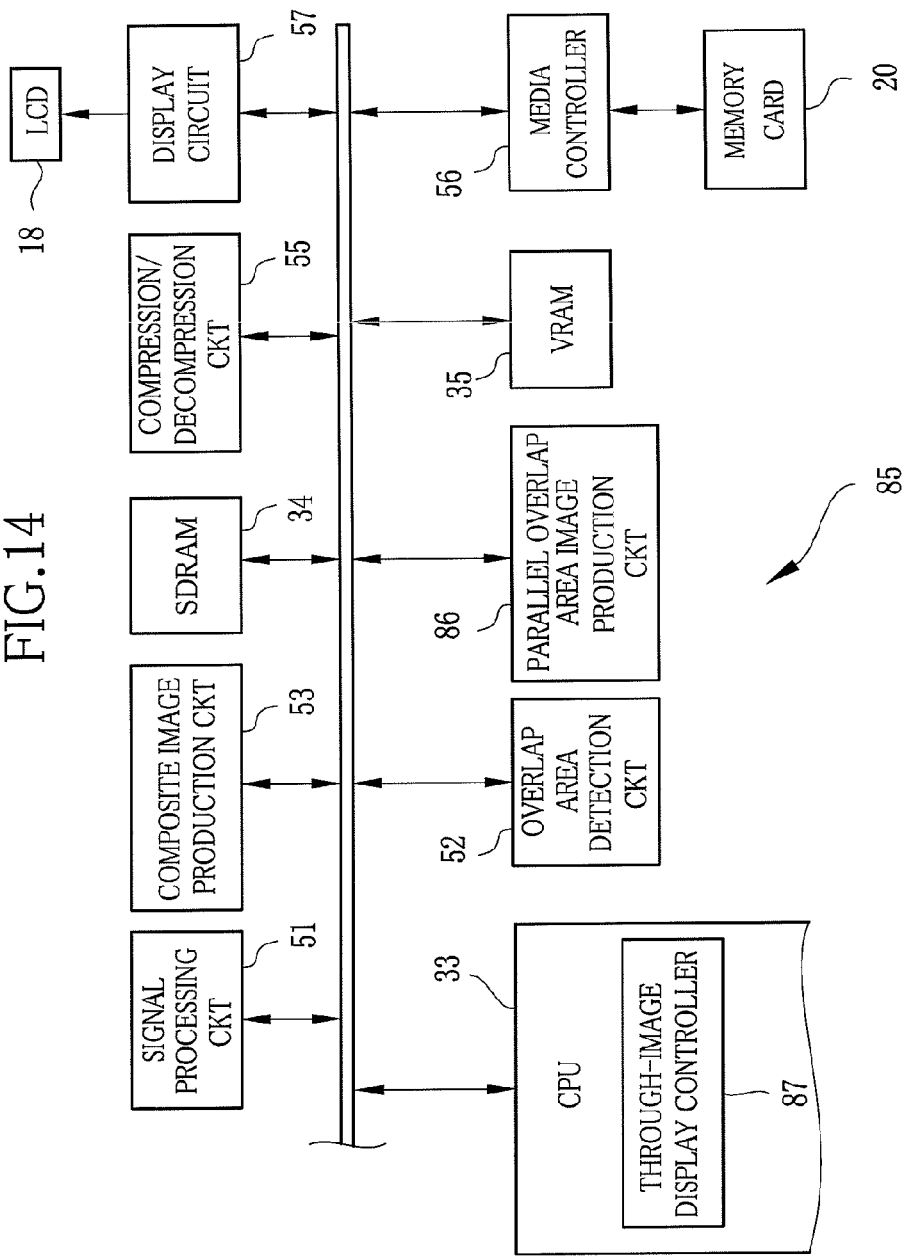
FIG. 14 is a block diagram illustrating the circuitry of a pantoscopic camera in accordance with a further embodiment of the present invention, wherein overlap area images are displayed in parallel.

Next, a pantoscopic camera 85 in accordance with another embodiment of the present invention will be described with reference to FIG. 14. In the above-described first embodiment, after it is determined that the framing position is fixed, an overlap area image 72 produced from either one of right and left images is displayed on a LCD 18. The pantoscopic camera 85 displays both right and left overlap area images 72R and 72L corresponding to the respective overlap areas 60 of the right and left images instead.

The pantoscopic camera 85 may have basically the same structure as the pantoscopic camera 10 of the first embodiment, or may also have basically the same structure as any of the above-described embodiments. However, the pantoscopic camera 85 is provided with a parallel overlap area image production circuit (hereinafter called simply parallel image production circuit) 86 instead of the overlap area image production circuit 54. And a CPU 33 serves as a through-image display controller 87 that is different from the through-image display controller 67 of the first embodiment.

The parallel image production circuit 86 produces right and left overlap area image data corresponding to the respective overlap areas 60 of the right and left images on the basis of the right and left image data stored in SDRAM 34 under the control of the CPU 33. The through-image display controller 87 basically operates the same way as the through-image display controller 67 of the first embodiment.

Hereinafter, the operation of the pantoscopic camera 85 in the above-described structure will be described. A sequence of processes until a shutter button 15 is half-pressed will be omitted, as these processes are basically similar to the first embodiment except that the parallel image production circuit 86 produces the right and left overlap area image data.

Upon receiving a decision-of-framing signal, the through-image display controller 87 sends an image storing command to the parallel image production circuit 86. In response to the image storing command, the parallel image production circuit 86 stores the produced right and left overlap area image data in VRAM 35. Then, the through-image display controller 87 sends a dual-screen display command to a display circuit 57.

Figure 15:
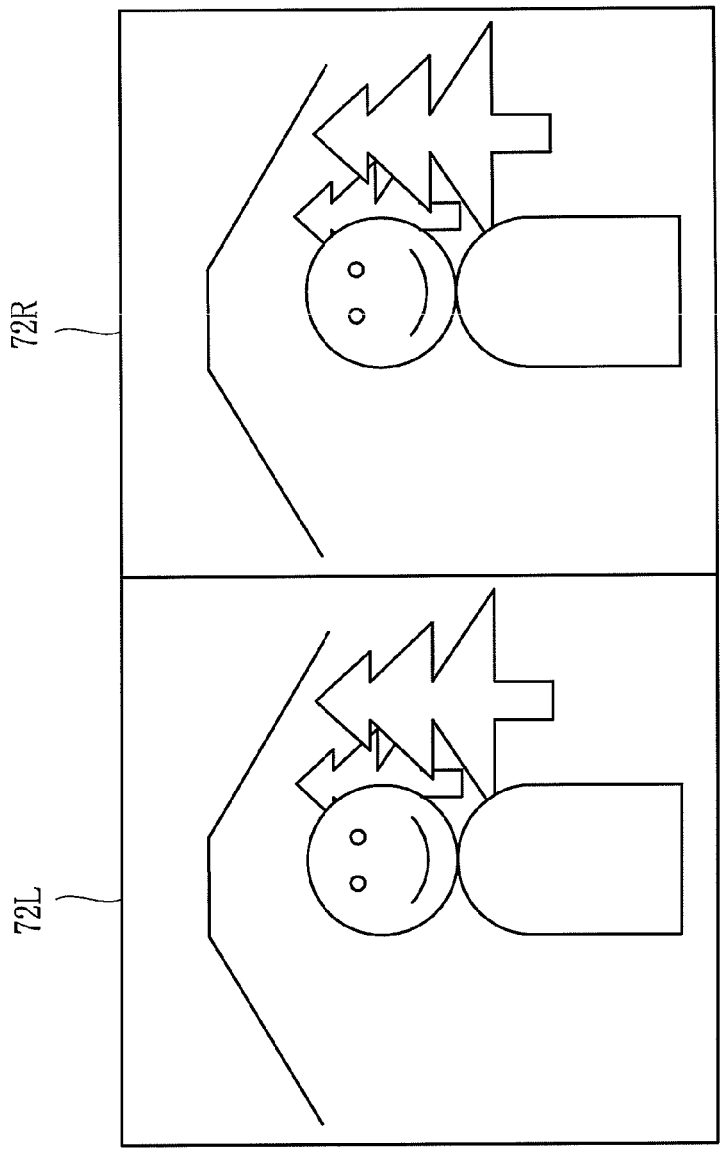
FIG. 15 is an explanatory diagram illustrating the parallel display of overlap area images.

As shown in FIG. 15, in response to the dual-screen display command, the display circuit 57 controls the LCD 18 to display the right and left overlap area images 72R and 72L corresponding to respective right and left overlap area image data side by side as a through-image. Thus, to the user can confirm the overlap area images from both-side viewpoints.

Figure 16:
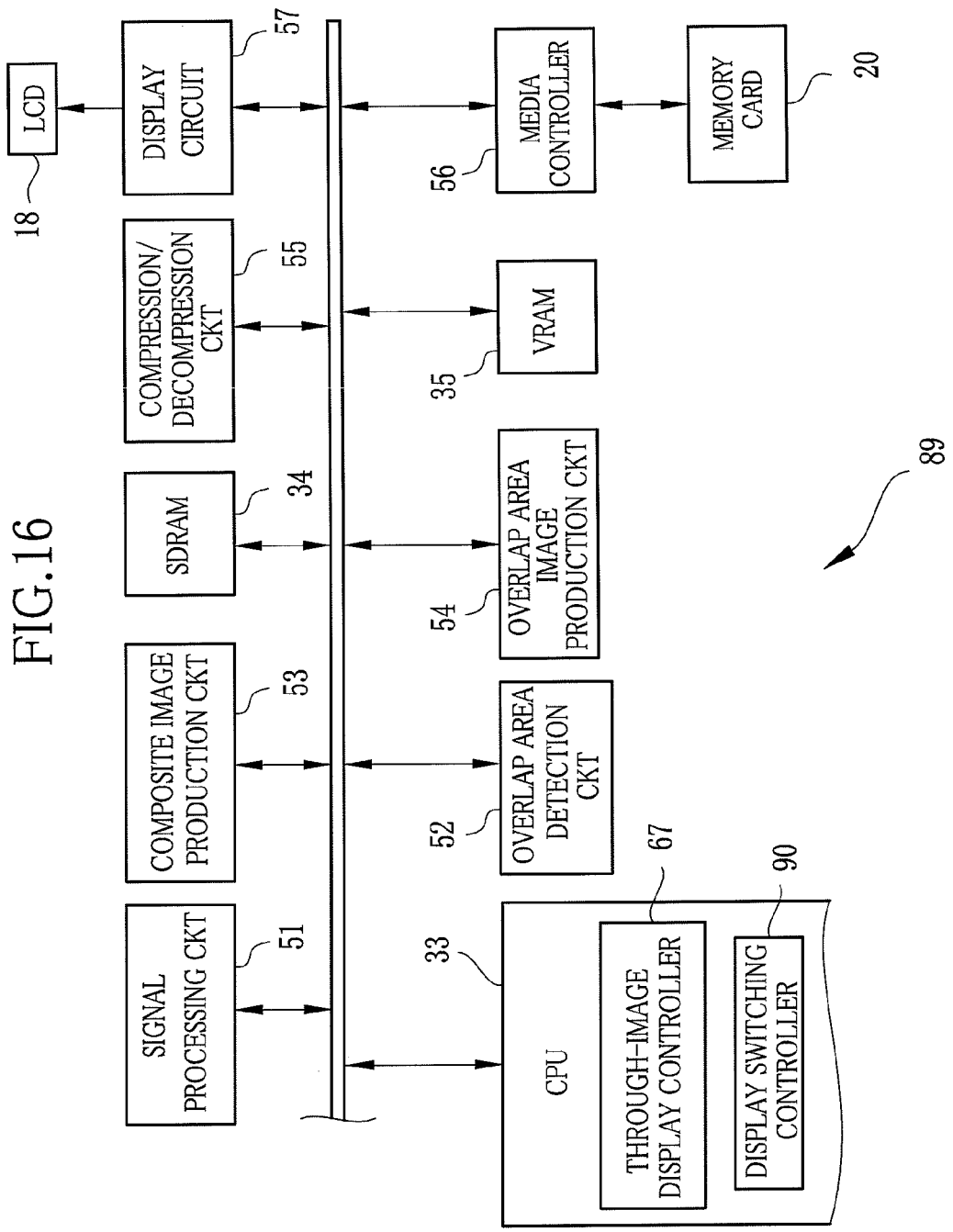
FIG. 16 is a block diagram illustrating the circuitry of a pantoscopic camera in accordance with another embodiment of the present invention, wherein the display of overlap area images is switchable.

Next, a pantoscopic camera 89 in accordance with a further embodiment of the present invention will be described with reference to FIG. 16. According to the above embodiment illustrated in FIGS. 14 and 15, right and left overlap area images 72R and 72L are displayed on dual-screen of the LCD 18. The pantoscopic camera 89, on the other hand, selects either of the right and left overlap area images 72R and 72L to display on the LCD 18.

The pantoscopic camera 89 may also have basically the same structure as either of the pantoscopic cameras 10, 75 and 80 of the above embodiments. However, a CPU 33 of the pantoscopic camera 89 serves as a display switching controller (or switching command output device) 90 as well. The display switching controller 90 controls a through-image display controller 67 to switch the display of the right and left overlap area images 72R and 72L.

When an image switching operation is carried out at an operating section 19 while an overlap area image is being displayed, the display switching controller 90 sends a display image switching command to the through-image display controller 67. For example, when the left overlap area image 72L is displayed on the LCD 18, the through-image display controller 67 controls an overlap area image production circuit 54 to produce right overlap area image data in response to the display image switching command. Then, the overlap area image production circuit 54 produces the right overlap area image data on the basis of right image data, causing the LCD 18 to switch from the left overlap area image 72L to the right overlap area image 72R. In the same way as the embodiment illustrated in FIG. 15, to the user can confirm both the right and left overlap area images.

Instead of sending the display image switching command to the through-image display controller 67 upon the image switching operation on the operating section 19, the display switching controller 90 may output the display image switching command to the through-image display controller 67 at regular time-intervals.

Next, a pantoscopic camera 93 in accordance with another embodiment of the present invention will be described with reference to FIG. 17. The pantoscopic camera 93 has two kinds of image capturing modes; 3D information obtaining mode and stereoscopic display mode. In the 3D information obtaining mode, 3D information about the subject is obtained from the right and left image data as with the above-described first embodiment. The stereoscopic display mode is to display a stereoscopic image on the basis of the right and left image data captured by imaging the subject.

The pantoscopic camera 93 may have basically the same structure as any of the pantoscopic cameras of the above-mentioned embodiments. However, the pantoscopic camera 93 is provided with a stereoscopic LCD 94 and a stereoscopic display circuit 95 instead of a LCD 18 and a display circuit 57. A mode switch 22 is to switch the operation of the camera 93 between the 3D information obtaining mode, the stereoscopic display mode and the reproduction mode. When the operation mode is set into the stereoscopic display mode, a signal processing circuit 51 stores right and left image data in VRAM 35.

Also, a CPU 33 of the pantoscopic camera 93 serves as a through-image display controller 96 which is different from the above-mentioned through-image display controller 67.

The stereoscopic display circuit 95 produces a stripe image from a pair of right and left images stored in the VRAM 35 and outputs data of the stripe image to the stereoscopic LCD 94, wherein the stripe image is composed of stripes of alternating right and left image fragments.

The stereoscopic LCD 94 has a lenticular lens mounted on the front. The lenticular lens makes the left image fragments of the stripe image visible to user's left eye only, and the right image fragments to user's right eye only. Thus, the user will observe a stereoscopic image when looking at the LCD 94 because of the parallax between the alternating fragments of the right and left images.

When the operation mode is set into the 3D information obtaining mode, the through-image display controller 96 controls an overlap area detection circuit 52, a composite image production circuit 53 and an overlap area image production circuit 54 in the same manner as in the above-described first embodiment. When the operation mode is set into the stereoscopic display mode, the through-image display controller 96 stops the operation of these circuits 52, 53 and 54.

Hereinafter, the operation of the pantoscopic camera 93 in the above-described structure will be described with reference to the flowchart shown in FIG. 18. When the camera 93 is in the 3D information obtaining mode, the operation sequence is basically the same as in the first embodiment. In the camera 93, however, before a shutter button 15 is half-pressed, two copies of the same composite image data are produced and stored in the VRAM 35. After the shutter button 15 is half-pressed, two copies of the same overlap area image data are produced and stored in the VRAM 35.

The stereoscopic display circuit 95 produces stripe image data on the basis of the two copies of the same composite image data or the two copies of the same overlap area image data and outputs the stripe image data to the stereoscopic LCD 94. Since there is no parallax between the same composite image or between the same overlap area image, a composite image 71 or an overlap area image 72, displayed on the basis of the stripe image data that is produced from the same composite image data or the same overlap area image data, does not look stereoscopic but two-dimensional on the LCD 94 in the 3D information obtaining mode.

On the other hand, when the operation mode is set into the stereoscopic display mode, the through-image display controller 96 stops the operations of the overlap area detection circuit 52, the composite image production circuit 53 and the overlap area image production circuit 54. The through-image display controller 96 sends a stereoscopic display command to the stereoscopic display circuit 95 every time a new pair of right and left image data frames are stored in the VRAM 35.

Upon receiving the stereoscopic display command, the stereoscopic display circuit 95 reads out the right and left image data from the VRAM 35, to produce the stripe image data and output the stripe image data to the stereoscopic LCD 94. Thus, the stereoscopic LCD 94 displays a stereoscopic image as a through-image. In case where a framing window 70 for showing an overlap area 60 is displayed on a stereoscopic image, the framing window 70 could be so inconspicuous within the stereoscopic image that the framing window 70 would not useful for the user to fix the framing position. In the embodiment of FIG. 17, on the contrary, because the composite image 71 with a framing window 70 is displayed two-dimensionally before the half-press of the shutter button, i.e. in the 3D information obtaining mode, the user can effectively fix the framing position with reference to the framing window 70 on the composite image 71.

Figure 17:
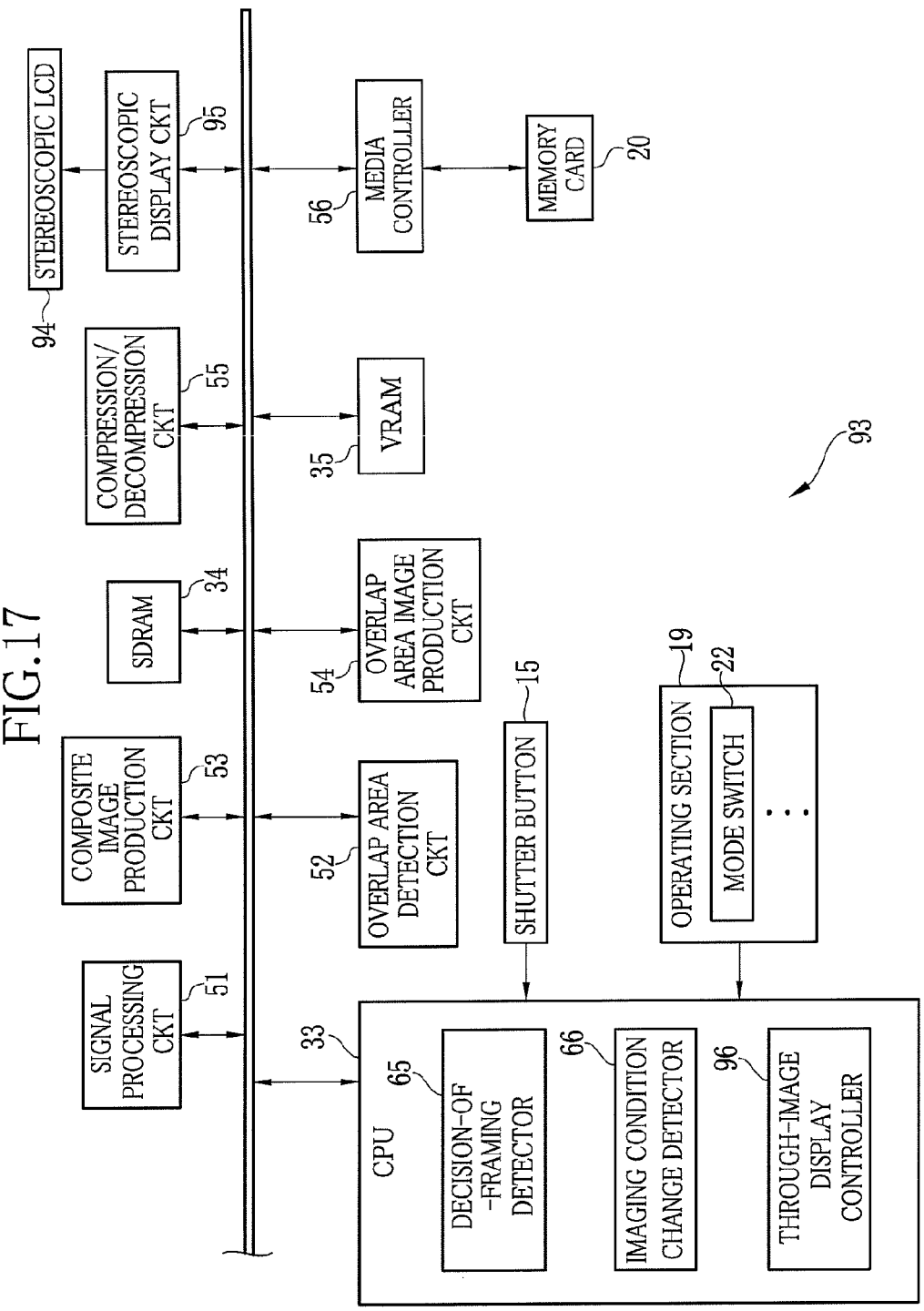
FIG. 17 is a block diagram illustrating the circuitry of a pantoscopic camera in accordance with still another embodiment of the present invention, which has a stereoscopic display mode.
Figure 18:
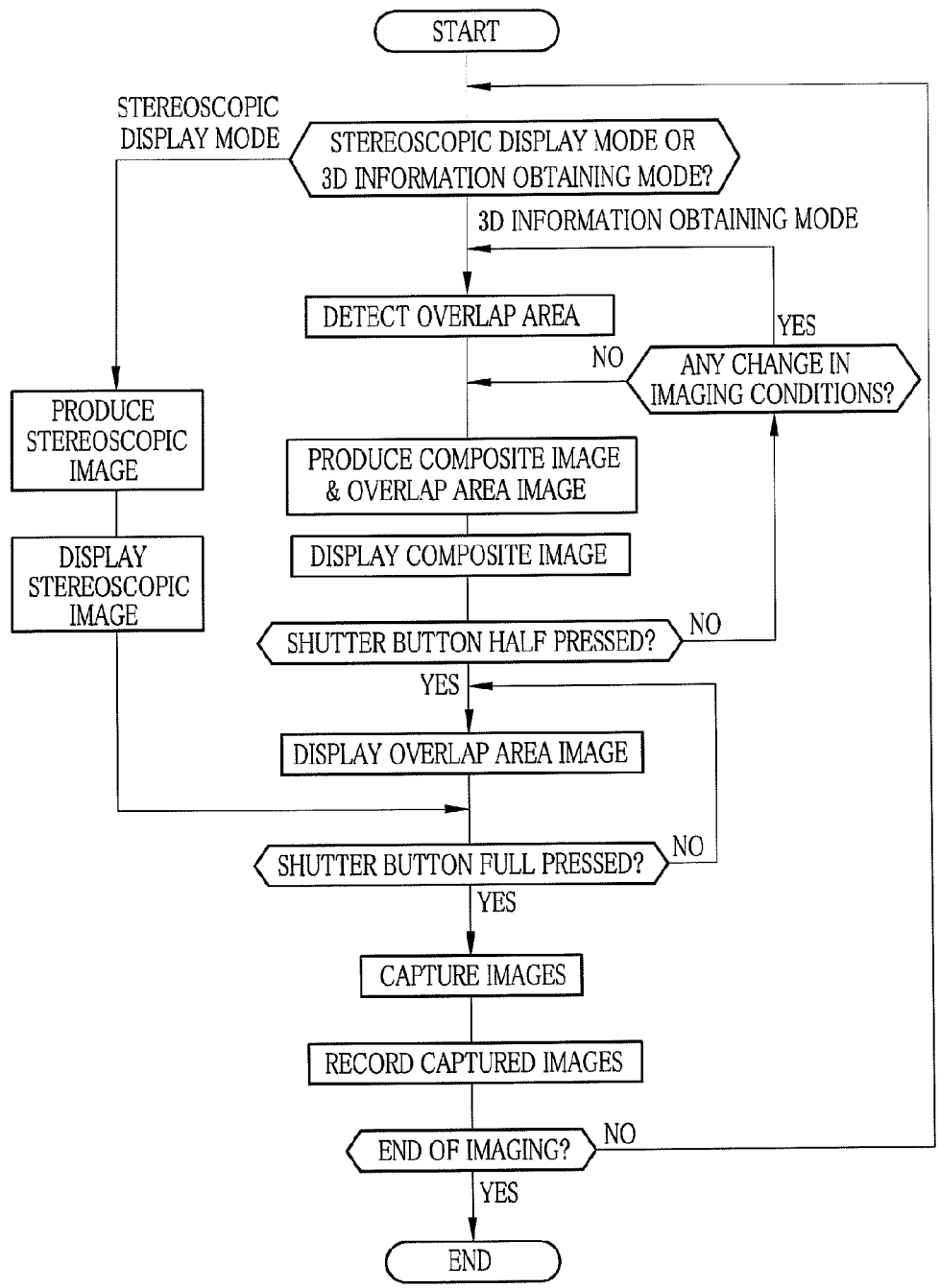
FIG. 18 is a flowchart illustrating a sequence of imaging processes in the pantoscopic camera of FIG. 17.

Although the embodiment illustrated in FIGS. 17 and 18 has been described as a camera of lenticular stereoscopic display type, any of other various known stereoscopic display methods is applicable, including Parallax Barrier, Anaglyph, Frame Sequential and Light Direction Control System etc.

Next, a pantoscopic camera 100 in accordance with another embodiment of the present invention will be described with reference to FIG. 19. While the 3D information obtaining apparatus 29, which is provided separately from the camera, obtains 3D information in the above-described embodiments, the pantoscopic camera 100 of this embodiment obtains the 3D information from right and left image data by itself. That is, the camera 100 functions also as a 3D information obtaining apparatus.

Except for being provided with a 3D information obtaining circuit 101, the pantoscopic camera 100 may have the same structure as the pantoscopic camera 10 of the first embodiment or any cameras of the above-described embodiments. The 3D information obtaining circuit 101 obtains 3D information from right and left image data stored in SDRAM 34 under the control of CPU 33.

Figure 19:
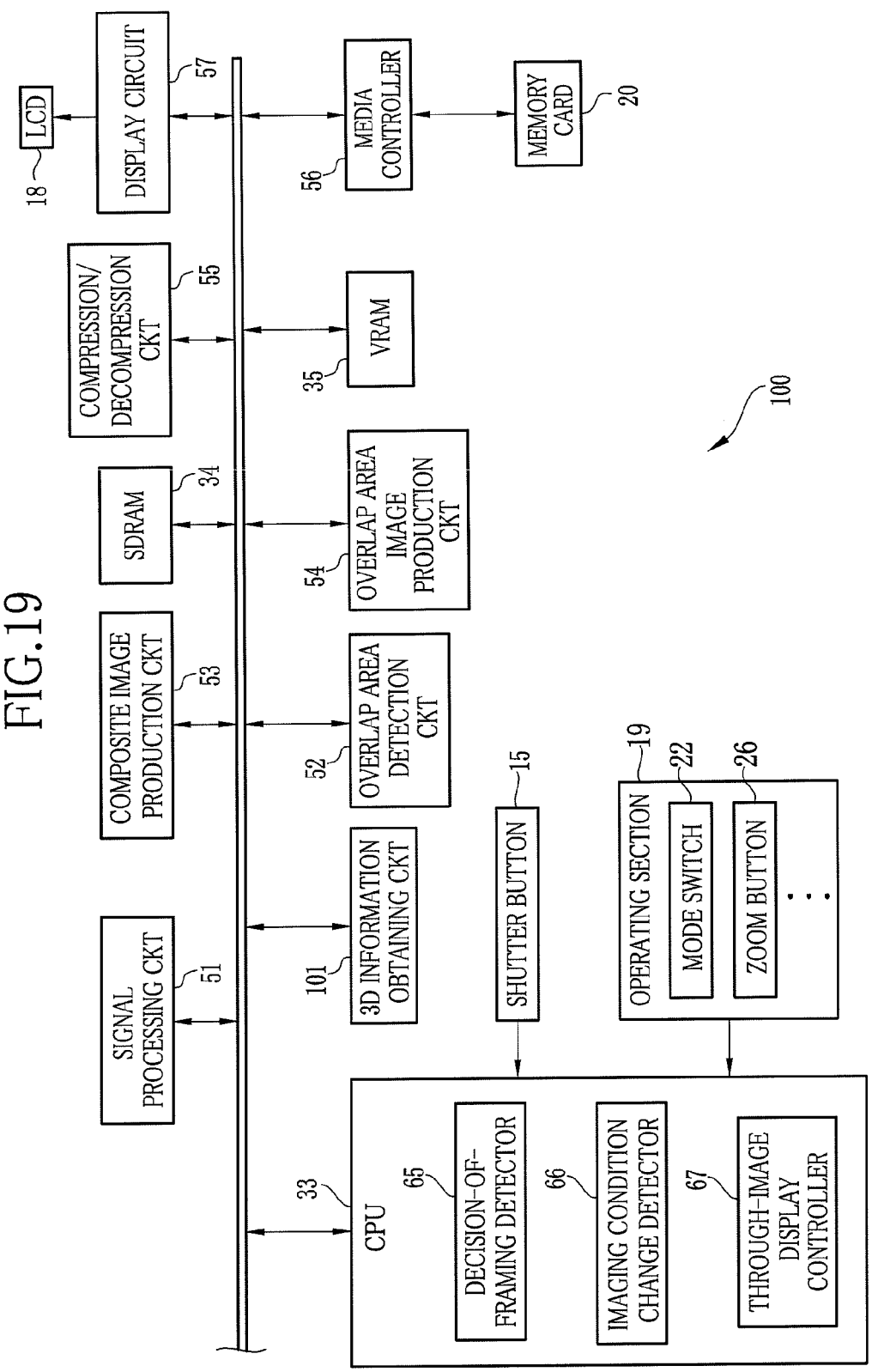
FIG. 19 is a block diagram illustrating the circuitry of a pantoscopic camera in accordance with a further embodiment of the present invention, wherein three-dimensional information is obtained from a pair of right and left images.

Hereinafter, the operation of the pantoscopic camera 100 as illustrated in FIG. 19 will be described with reference to the flowchart of FIG. 20. A sequence of processes until a shutter button 15 is full-pressed will be omitted, as it is basically the same as in the first embodiment.

Responding to a full-pressing operation of the shutter button 15, an image of a subject is captured by each of first and second imaging units 12 and 13, to output image signals of a pair of right and left images. After going through a signal processing circuit 49, data of the right and left images is stored in the SDRAM 34. After storing the right and left image data, the CPU 33 sends a 3D information obtaining command to the 3D information obtaining circuit 101.

In response to the 3D information obtaining command, the 3D information obtaining circuit 101 starts a distance calculation for obtaining the 3D information about the subject on the basis of an overlap area detection result by an overlap area detection circuit 52 and the right and left image data stored in the SDRAM 34. The 3D information obtaining circuit 101 determines which pixels in an overlap area 60 of the left image respectively correspond to pixels in an overlap area 60 of the right image by pattern matching and other succeeding processes.

Next, the 3D information obtaining circuit 101 calculates distances to those points on the subject corresponding to respective pixels in the overlap areas 60, i.e. 3D coordinate values, using stereo method (triangulation) based on the above correlation of the pixels and stereo calibration data including a known reference length and a focal distance. Because the distance calculation using the stereo method is well-known in the art, the explanation will be omitted (see, for example, JPA 1993-231822 and JPA 2008-252493.)

The distance calculation provides the 3D information representative of the respective points on the subject corresponding to the respective pixels in the overlap areas 60 in a 3D coordinate system. With the right and left image data stored in the SDRAM 34, the 3D information is recorded in a memory card 20 via a media controller 56. When it is unnecessary to record the right and left image data, only the 3D information is recorded in the memory card 20. Thereafter, the above-described processing is repeatedly carried out during the image capturing mode.

The pantoscopic camera 100 can use the result of the above-described distance calculation as a subject distance for focusing, instead of detecting the subject distance based on distance data from a rangefinder sensor 48.

In the above-described embodiments, the imaging condition change detector 66 detects changes of imaging conditions such as the reference length, focal distance and subject distance. to the imaging condition change detector may also detect changes of other various imaging conditions which will change the range of the overlap areas 60, including, for example, a change in convergence angle of the first and second imaging units 12 and 13.

Although the above-described embodiments have been described and illustrated as pantoscopic cameras having two taking lenses, the present invention may also be applicable to a pantoscopic camera with three or more taking lenses. For example, a three-lens camera provided with first, second and third imaging units may carry out the above-described display of through-images based on images captured through two of the three imaging units.

Although the present invention has been described with respect to pantoscopic cameras, the present invention may also be applicable to such a single-lens camera that captures images from a subject at different angles of view while displacing camera positions. In that case, it is possible to execute the above-described overlap area detection and production of composite image data and overlap area image data based on image data captured from the subject at a previous angle of view and image data captured from the same subject at a new angle of view.

It should be understood that the embodiments of the present invention have been disclosed for illustrative purposes only. Those skilled in the art will appreciate that various modifications, additions and substitutions are possible without departing from the scope and spirit of the invention as disclosed in the accompanying claims.

What is claimed is:

1. An imaging apparatus comprising:
    an imaging device that captures a plurality of images of a subject from different points of view;
    an overlap area detecting device that detects an overlap area from each of the plurality of images captured by said imaging device, the plurality of images overlapping with each other at the overlap areas;
    a composite image producing device that produces a wide angle composite image from the plurality of images on the basis of a result of detection by said overlap area detecting device, said composite image being composed of one overlap area and respective non-overlap areas other than the overlap areas of the plurality of images;
    an overlap area image producing device that produces an overlap area image from at least one of the plurality of images, said overlap area image corresponding to at least one of the overlap areas;
    a display device that displays said composite image as a moving image;
    a decision-of-framing detecting device that detects whether said imaging apparatus is fixed at a framing position for image-recording or not;
    a display control device that switches said display device from said composite image to said overlap area image when said decision-of-framing detecting device detects that said imaging apparatus is fixed at a framing position; and
    a standstill detecting device that determines whether said imaging apparatus is at a standstill or not, wherein said decision-of-framing detecting device determines that said imaging apparatus is fixed at a framing position when said standstill detecting device detects a standstill of said imaging apparatus, wherein
    said standstill determining device comprises:
        a movement detecting device that detects a movement of said imaging apparatus based on a shift amount between two successive image frames obtained by said imaging device, and
        a determining device that determines whether said imaging apparatus is at a standstill or not depending upon whether the movement detected by said movement detecting device is below a threshold level or not, and wherein
    said imaging device includes an imaging optical system movable between a plurality of zooming positions, and said determining device changes the threshold level according to the zooming position of said imaging optical system,
    said determining device raises the threshold level as the zooming position of said imaging optical system approaches a telephoto terminal,
    said standstill determining device determines the threshold level for the shift amount depending upon the zooming position of the imaging device,
    said standstill determining device compares the shift amount with the determined threshold level,
    the shift amount is calculated by said standstill determining device,
    the standstill determining device determines that the imaging apparatus is moving in a ease that the calculated shift amount is representative of a movement greater than the determined threshold level, and
    the standstill determining device determines that the imaging apparatus is standstill in a case that the calculated shift amount is representative of a movement less than the determined threshold level.

2. The imaging apparatus of claim 1, wherein said composite image producing device trims parts of the non-overlap areas of said composite image to adjust said composite image in aspect ratio to screen size of said display device if said composite image originally has a different aspect ratio from that of the screen size.

3. The imaging apparatus of claim 1, wherein said composite image producing device compresses the non-overlap areas of said composite image such that said display device can display the whole content of said composite image if said composite image originally has a different aspect ratio from that of screen size of said display device.

4. The imaging apparatus of claim 1, wherein said composite image producing device compresses said composite image to adjust an aspect ratio of said composite image to screen size of said display device such that said display device can display the whole content of said composite image.

5. The imaging apparatus of claim 1, wherein said standstill detecting device includes an acceleration sensor.

6. The imaging apparatus of claim 1, wherein said overlap area image producing device produces a plurality of said overlap area images from the plurality of images, said overlap area images corresponding to the respective overlap areas of the plurality of images, and wherein said display control device controls said display device to display the plurality of said overlap area images in an array.

7. The imaging apparatus of claim 1, wherein
said overlap area image producing device produces a plurality of said overlap area images from the plurality of images, said overlap area images corresponding to the respective overlap areas of the plurality of images, wherein
said display control device controls said display device to display either of said overlap area images when said decision-of-framing detecting device detects that said imaging apparatus is fixed at a framing position, and wherein
said imaging apparatus further comprises a switching command input device for inputting a switching command to said display control device to switch said display device to display another one of said overlap area images.

8. The imaging apparatus of claim 1, wherein
said display device can display a stereoscopic image on the basis of the plurality of images, and
said imaging apparatus has a stereoscopic display mode for displaying a stereoscopic image on said display device, and a three-dimensional information obtaining mode for obtaining three-dimensional information from the plurality of images, the three-dimensional information representing spatial position of the subject in a predetermined spatial coordinate system, and wherein
said overlap area detecting device, said composite image producing device, and said overlap area image producing device are activated merely in the three-dimensional information obtaining mode but not in the stereoscopic display mode.

9. The imaging apparatus of claim 8, wherein said display device displays said composite image and said overlap area image respectively as two-dimensional images in said three-dimensional information obtaining mode.

10. The imaging apparatus of claim 1, wherein said imaging device captures the plurality of images of the subject simultaneously from different points of view.

11. The imaging apparatus of claim 1, wherein said display device displays said composite image such that the overlap area is distinguishable within said composite image.

12. A three-dimensional information obtaining system comprising:
an imaging apparatus as recited in claim 1, capturing a plurality of images of a subject from different points of view; and
a three-dimensional information obtaining device that obtains, on the basis of the plurality of images, three-dimensional information that represents spatial position of the subject in a predetermined spatial coordinate system.

13. A method of controlling an imaging apparatus having an imaging device that captures a plurality of images of a subject from different points of view, said method comprising the steps of:

detecting an overlap area from each of the plurality of images captured by said imaging device, the plurality of images overlapping with each other at the overlap areas;
producing a wide angle composite image from the plurality of images on the basis of a result of detection of said overlap areas, said composite image being composed of one overlap area and respective non-overlap areas other than the overlap areas of the plurality of images;
displaying said composite image as a moving image on a display device of said imaging apparatus;
producing an overlap area image from at least one of the plurality of images, said overlap area image corresponding to at least one of the overlap areas;
determining whether said imaging apparatus is fixed at a framing position for image-recording or not; and
switching said display device from said composite image to said overlap area image when it is determined that said imaging apparatus is fixed at a framing position;
determining whether said imaging apparatus is at a standstill or not;
determining whether said imaging apparatus is fixed at a framing position when a standstill of said imaging apparatus id detected;
detecting a movement of said imaging apparatus based on a shift amount between two successive image frames;
determining whether said imaging apparatus is at a standstill or not depending upon whether the movement detected is below a threshold level or not,
wherein said imaging device includes an imaging optical system movable between a plurality of zooming positions;
changing the threshold level according to the zooming position of said imaging optical system;
raising the threshold level as the zooming position of said imaging optical system approaches a telephoto terminal;
determining the threshold level for the shift amount depending upon the zooming position of the imaging device;
comparing the shift amount with the determined threshold level,
wherein the shift amount is calculated;
determining that the imaging apparatus is moving in a case that the calculated shift amount is representative of a movement greater than the determined threshold level; and
determining that the imaging apparatus is standstill in a case that the calculated shift amount is representative of a movement less than the determined threshold level.

14. The method of claim 13, wherein said step of determining whether said imaging apparatus is fixed at a framing position comprises judging that the framing position is fixed when a shutter button of said imaging apparatus is half-pressed.

15. The method of claim 13, wherein said step of determining whether said imaging apparatus is fixed at a framing position comprises judging that the framing position is fixed when said imaging apparatus comes to a standstill or not.

* * * * *